United States Patent

Tanaka et al.

[11] Patent Number: 5,104,033
[45] Date of Patent: Apr. 14, 1992

[54] SYSTEM AND APPARATUS FOR AND METHOD OF ASSEMBLING WORKPIECES

[75] Inventors: Haruo Tanaka; Yousuke Narita; Hiroshi Itoh; Shigeru Suzuki; Hidenori Horie; Akira Konno, all of Sayama, Japan

[73] Assignee: Honda Giken Kogyo Kabushiki Kaisha, Tokyo, Japan

[21] Appl. No.: 577,706

[22] Filed: Sep. 5, 1990

[30] Foreign Application Priority Data

Jul. 9, 1989 [JP] Japan ................................ 1-230380
Mar. 8, 1990 [JP] Japan ................................ 2-205215

[51] Int. Cl.$^5$ ...................... B23P 15/04; B23K 31/02
[52] U.S. Cl. .................................. 228/176; 228/212; 228/4.1; 228/12; 29/889.21; 29/792
[58] Field of Search ............... 228/176, 212, 213, 4.1, 228/12, 49.1; 29/889.21, 430, 792; 219/79

[56] References Cited

U.S. PATENT DOCUMENTS

| | | | |
|---|---|---|---|
| 3,691,618 | 9/1972 | Achterberg et al. | 29/889.21 |
| 3,991,927 | 12/1976 | Napor et al. | 228/47 |
| 4,450,611 | 2/1984 | Ito et al. | |
| 4,913,707 | 4/1990 | Moreno et al. | 29/792 |

FOREIGN PATENT DOCUMENTS 1290909 9/1972 United Kingdom .

Primary Examiner—Samuel M. Heinrich
Attorney, Agent, or Firm—Armstrong, Nikaido, Marmelstein, Kubovcik & Murray

[57] ABSTRACT

An apparatus for assembling workpieces in which an assembling work is performed includes a workpiece setting jig, a setting station including a workpiece setting apparatus for setting a first workpiece on the workpiece setting jig, an assembling station including an assembling unit for assembling a second workpiece with the first workpiece on the workpiece setting jig, a welding station including a welding unit for welding the first and the second workpieces together, a discharging station including a discharging unit for taking the welded workpieces out of the workpiece setting jig, a charging station provided in a position which faces the setting station as seen in the direction of sending and withdrawing the workpiece setting jig. The charging station, the assembling station, the welding station and the discharging station being arranged in a circular form. A mechanism is provided for circulating the workpiece setting jig among the charging station, the assembling station, the welding station and the discharging station in sequence. A mechanism is provided for reciprocating the workpiece setting jig between the setting station and the charging station. The method of assembling workpieces includes disposing the charging station in a position facing the setting station, and disposing the charging station, the assembling station, the welding station, and the discharging station in a circular form to a side of the setting station.

13 Claims, 26 Drawing Sheets

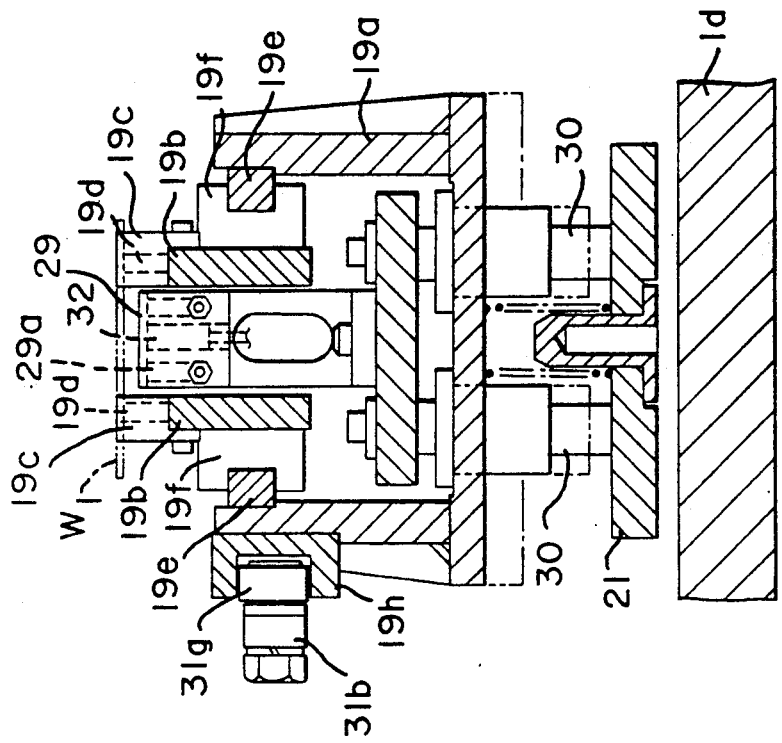

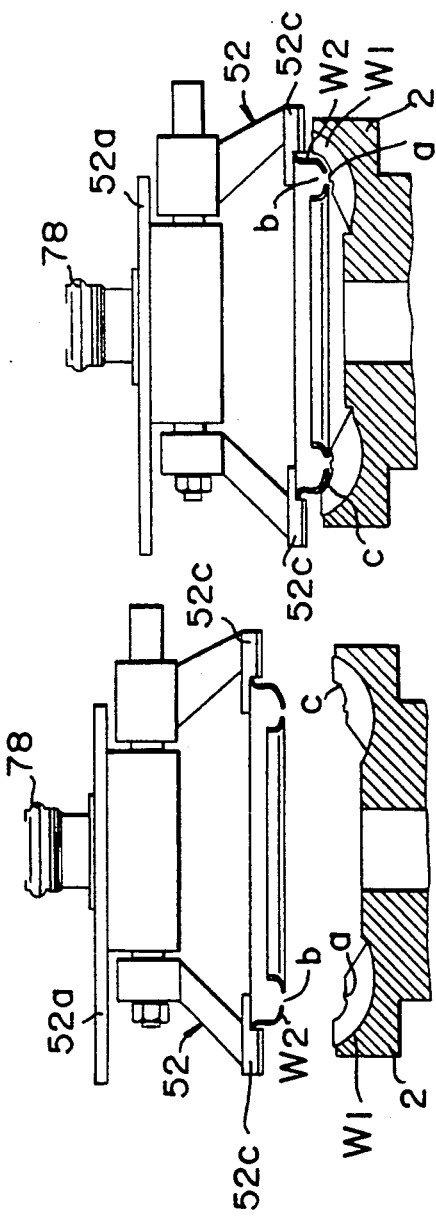
FIG.25(A)
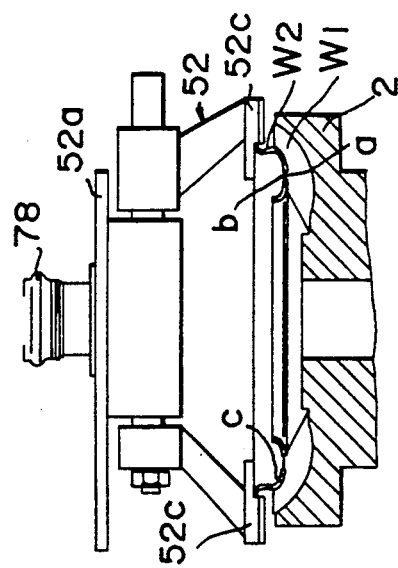
FIG.25(C)
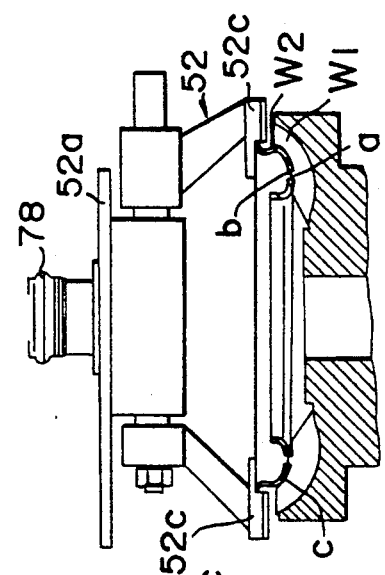
FIG.25(D)
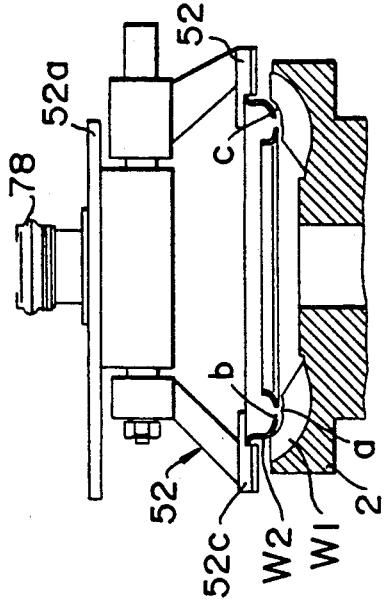
FIG.25(E)
FIG.25(B)

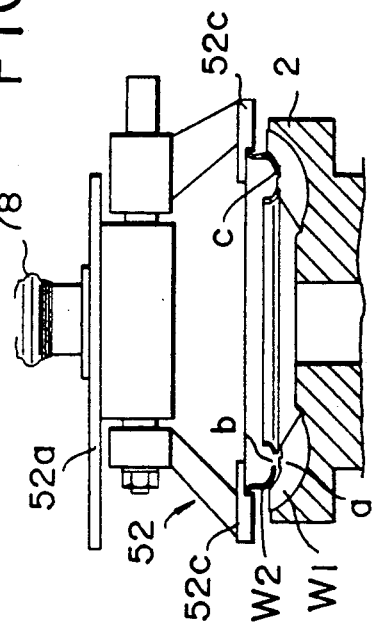
FIG.26(A)
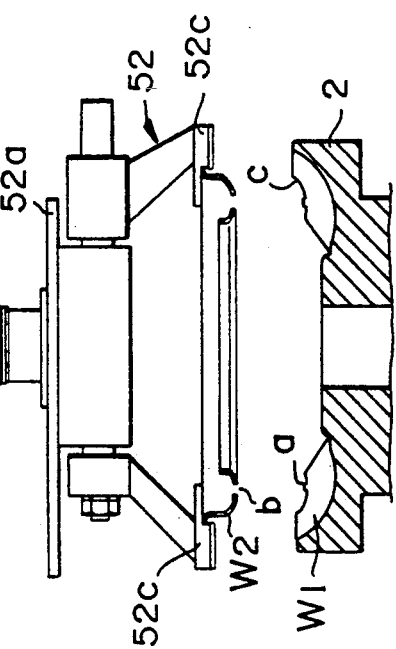
FIG.26(B)
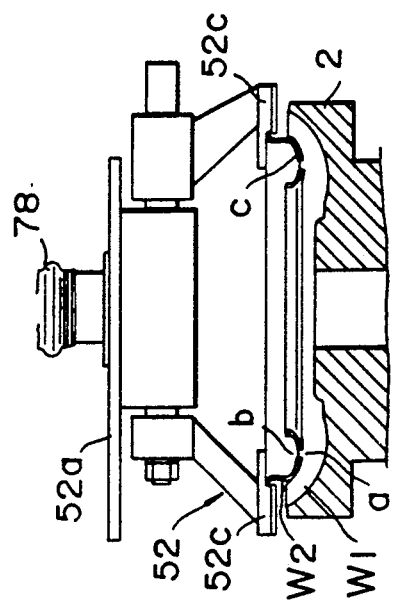
FIG.26(C)
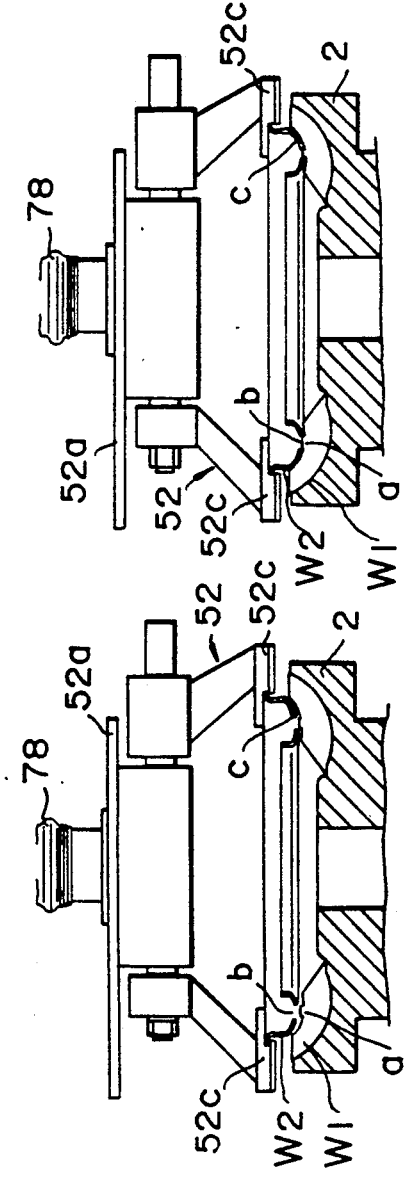
FIG.26(D)
FIG.26(E)

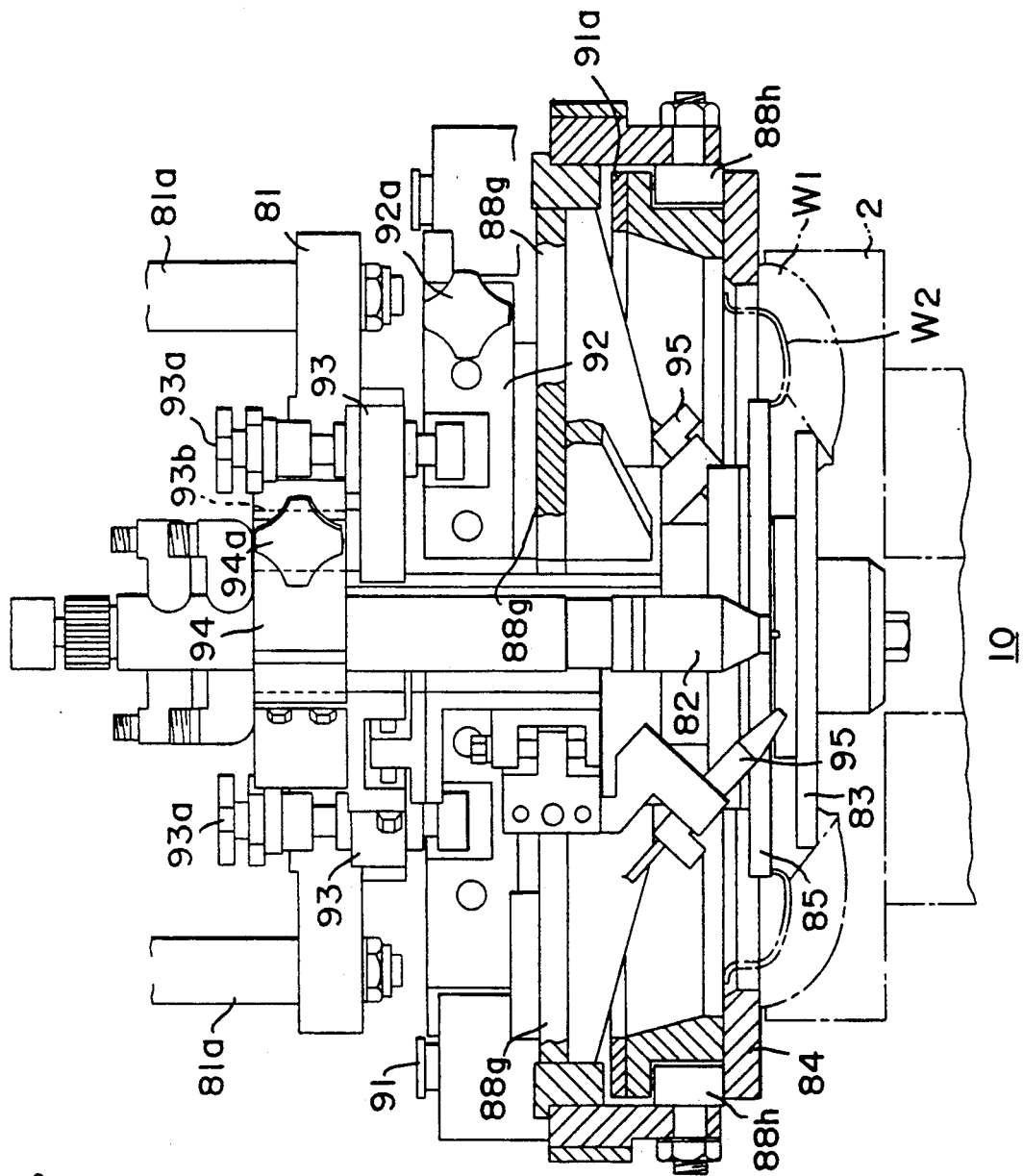

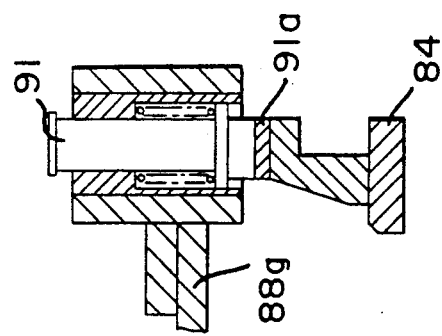
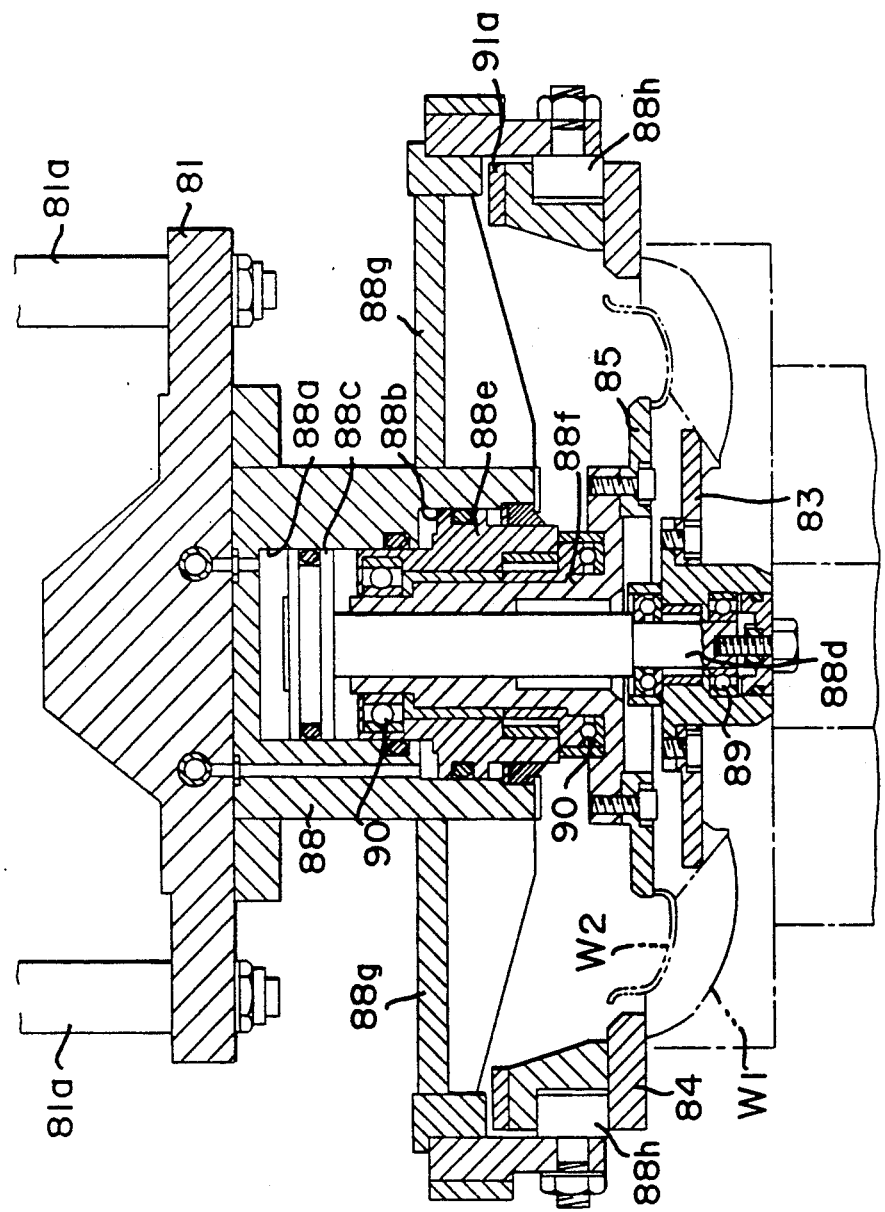

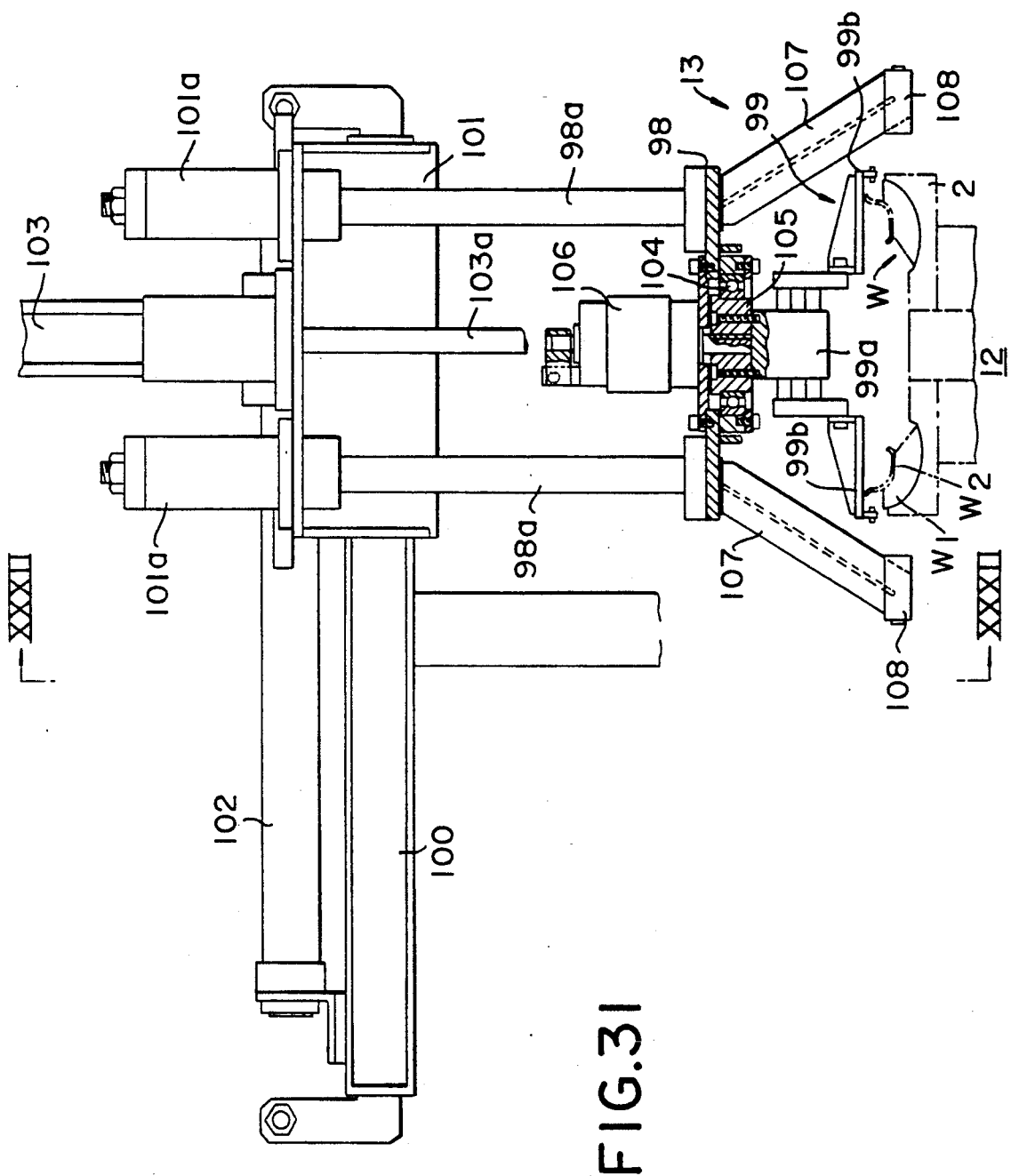

SYSTEM AND APPARATUS FOR AND METHOD OF ASSEMBLING WORKPIECES

BACKGROUND OF THE INVENTION

This invention relates to a method of assembling and a system and an apparatus for assembling in which blades which have been formed by pressing, e.g., in a press machine, are set on a blade setting jig and are assembled with a core by welding the blades and the core together.

Conventionally, an assembling station where an assembling step of assembling a core with blades set on a workpiece setting jig is performed, a welding station where welding step of welding the blades and the core together is performed, and a discharging station where a discharging step of taking out the welded subassembly from the workpiece setting jig is performed, are linearly disposed at a side of a setting station where a step of setting the blades on the workpiece setting jig is performed. In this arrangement, the workpiece setting jig in the setting station is intermittently transported by a transporting means from the setting station to the assembling station, the welding station and the discharging station in that order, and the emptied workpiece setting jig after the discharging step is returned via a return path to the setting station.

When the assembling station, the welding station and the discharging station are linearly disposed as described above, the working line extends for a long distance sideways, requiring as a whole a wide space.

OBJECT AND SUMMARY OF THE INVENTION

An object of this invention is to provide an assembling method and an apparatus therefor in which the assembling work of a workpiece can be performed even in a relatively narrow space.

In order to attain the above-mentioned object, the method of this invention comprises the steps of:
providing a setting station; disposing a charging station in a position facing the setting station, and disposing the charging station, an assembling station, a welding station, and a discharging station in a circular form to a side of the setting station;
setting a first workpiece on a workpiece setting jig at the setting station;
transferring the workpiece setting jig from the setting station to the charging station;
intermittently transferring the workpiece setting jig in sequence from the charging station to the assembling station, the welding station and the discharging station;
assembling a second workpiece with the first workpiece which has been set on the workpiece setting jig while the workpiece setting jig is at the assembling station;
welding the first and the second workpieces together while the workpiece setting jig is at the welding station;
discharging the welded workpieces by taking them off the workpiece setting jig when the workpiece setting jig is at the discharging station; and
returning the workpiece setting jig which has been emptied after the discharging from the charging station to the setting station.

The apparatus of this invention performs the inventive method for assembling workpieces in which an assembling work is performed. The apparatus comprises:
a workpiece setting jig;
a setting station including a workpiece setting apparatus for setting a first workpiece on the workpiece setting jig;
an assembling station including an assembling unit for assembling a second workpiece with the first workpiece on the workpiece setting jig;
a welding station including a welding unit for welding the first and the second workpieces together;
a discharging station including a discharging unit for taking out the welded workpieces from the workpiece setting jig;
a charging station provided in a position which faces the setting station as seen in the direction of sending and withdrawing the workpiece setting jig;
the charging station, the assembling station, the welding station and the discharging station being arranged in a circular form;
means for circulating the workpiece setting jig among the charging station, the assembling station, the welding station and the discharging station in sequence; and
means for reciprocating the workpiece setting jig between the setting station and the charging station.

The means for circulating the workpiece setting jig among the charging station, the assembling station, the welding station and the discharging station in sequence can comprise:
circular guide rails provided so as to pass through the charging station, the assembling station, the welding station and the discharging station;
a jig cart on which the workpiece setting jig can be mounted supported by the circular guide rails;
a transferring means for intermittently transferring the jig cart along the guide rails from the charging station to the assembling station, the welding station and the discharging station.

The means for reciprocating the workpiece setting jig between the setting station and the charging station includes that part of the guide rails which corresponds to the setting station which is constructed of movable rails which can be reciprocated between the charging station and the setting station. Means are provided for reciprocating the movable rails.

Because the charging station, the assembling station, the welding station and the discharging station are disposed in a circular form to a side of the setting station, the working line can be prevented from extending sideways. Consequently, the assembling work of the workpiece can be performed even in a relatively narrow space.

The workpiece setting jig on which a first workpiece has been set in place is moved from the setting station to the assembling station by the movement of the movable rails. The workpiece setting jig is intermittently transferred by the transferring apparatus to the assembling station, the welding station and the discharging station for the assembling of a second workpiece in the assembling station, the welding of both the first and the second workpieces in the welding station and the discharging of the welded workpiece in the discharging station. The emptied workpiece setting jig which has been returned to the charging station is moved to the setting station by the movement of the movable rails, and another first workpiece is set in position by the workpiece setting apparatus.

A pinching means for detachably pinching the workpiece is provided at the setting station. The workpiece setting jig is provided on a movable frame which is movable up and down and which can reciprocate between the setting station and the charging station. The workpiece setting jig in the setting station on which the first workpiece has been set in position is transferred to the charging station by the movement of the movable frame. However, if the workpiece setting jig in the setting station is lifted and moved horizontally and lowered to place it on the guide rails in the charging station, there is a fear that the workpiece on the workpiece setting jig might be misaligned due to the vibrations when the workpiece setting jig is placed on the guide rails.

This kind of disadvantage can, however, be eliminated by employing the following construction. Those portions of the guide rails which correspond to the charging station are constructed as movable rails which can be reciprocated between the charging station and the setting station so that the workpiece setting jig can be moved from the setting station to the charging station while being positioned on the movable rails.

By providing the movable rails on a movable cart which is mounted on travelling rails laid between the charging station and the setting station with the movable rails being movable in a direction which crosses the travelling rails at right angles, the position of the workpiece setting jig relative to the workpiece setting apparatus can be changed or adjusted depending on the kind and model of the workpieces.

In the case where the first workpiece is a press-formed workpiece of an arcuate form and where it is taken out from an upper side of the lower mold of the press machine towards the front side thereof by holding it by suction, it is sometimes impossible for it to be firmly held due to its arcuate shape.

But in the case where the press-formed workpiece is handed over downwards to the discharging apparatus through an ejecting hole in the lower mold by a workpiece receiving member which moves up and down in an interlocking relationship with the upward and downward movements of the upper mold, the workpiece is then moved by the discharging apparatus to the takeout position in front thereof. Thus when the workpiece is set in position on the workpiece setting jig in front thereof, the workpiece can be securely set on the workpiece setting jig in an interlocking relationship with the up and down movements of the upper mold.

In this case, because the workpiece receiving member and the discharging apparatus are positioned below the lower mold, maintenance work is difficult because of the lower mold which hampers the work. However, when a base plate is provided on the bolster of the press machine so as to be movable sideways relative thereto, and when the workpiece receiving member, the discharging apparatus and the transferring apparatus are mounted on the base plate, the workpiece receiving member and the discharging apparatus can be withdrawn sideways together with the base plate. Maintenance work can thus be improved. Additionally, the workpiece setting apparatus can be exchanged together with the base plate as a unit when the kind and model of the workpieces are changed over.

When the discharging apparatus is constituted by a pair of right and left transfer bars having upper surfaces provided with receiving portions and which are movable back and forth, and when the workpiece receiving member is disposed between both of the transfer bars, the press-formed workpiece received from the workpiece receiving member can be supported at the right and left lower portions by the pair of transfer bars. Therefore, the workpiece can be stably held and be securely discharged to the takeout position.

In such a case that the press-formed workpiece are blades of a turbine wheel or a pump wheel for a torque converter for an automobile, a number of inserting grooves which can hold the blades in the same posture as the posture in which the blades are mounted on a shell of the turbine wheel or the pump wheel, are radially formed on the workpiece setting jig. The workpiece setting jig is capable of index-rotating by a pitch at which the inserting grooves are arranged and the blades can be set in position on the workpiece setting jig in the above-mentioned posture. As a consequence, the assembling work of the blades with the shell can be performed easily.

In the case of a workpiece such as the wheel blades, it is preferable that they are discharged to the takeout position substantially in a horizontal posture and that they are inserted into the workpiece setting jig in front thereof with the rear edges of the workpiece facing downwards. In order to accomplish this goal, the transferring apparatus is constituted by the following structure. A movable frame carries the workpiece pinching means for detachably pinching the press-formed workpiece. A crank arm is connected for rotatably supporting the movable frame. A sliding member is disposed in front of the crank arm and is connected to the crank arm via a first link for performing a substantially linear movement of the sliding member according to the rotation of the crank arm. A fixed arm is fixed to the sliding member in a positional relationship such that, when the first link rotates relative to the sliding member while moving forwards by the rotation of the crank arm, the angle between the fixed arm and the first link becomes smaller. A second link for connecting a front end of the movable frame and the fixed arm is arranged having an extended axial line thereof passing above a supporting shaft for supporting the crank arm. In this manner and on this equipment, the press-formed workpiece which is discharged to the takeout position in a substantially horizontal posture, can be set on the workpiece setting jig with the rear edge facing downwards.

According to another feature of this invention, in such a case that the first workpiece is blades for a wheel, and the second workpiece is a core onto which the blades are to be assembled, the assembling unit comprises: a lifting frame disposed in the assembling station; a supporting plate mounted on the lifting frame via a joint member, the supporting plate being movable in the horizontal and upward directions and able to incline; a core pinching means mounted on the supporting plate for relatively gently pinching the core at an external periphery thereof; a sensor for detecting the upward and downward movements of the supporting plate relative to the lifting frame; and a rotating mechanism for rotating the workpiece setting jig which is positioned in the assembling station.

In assembling the core with the blades which have been set on the workpiece setting jig, after the lower surface of the core has abutted projections of the blades as a consequence of lowering of the core by the movement of the lifting frame, the workpiece setting jig is rotated by the rotating mechanism to fit the projections of the blades to the engaging holes in the core.

In this case, if the core is pinched relatively strongly by the core pinching means, an excessive force will be exerted on the blades via the core through the subsequent rotation of the workpiece setting jig after the insertion of the projections of the blades into the engaging holes in the core. Therefore, there is a possibility that the blades might be bent. However, this potential disadvantage can be eliminated by relatively gently pinching the core by the pinching means.

In addition, by detecting that the supporting plate has been lowered relative to the lifting frame with a sensor, when the core abuts the upper ends of the projections of the blades, from a condition in which the supporting plate was lifted relative to the lifting frame, it is possible to detect whether the blades have been fitted to the core or not.

According to still another feature of this invention, a system is proposed in which a turbine wheel and a pump wheel of a fluid torque converter are assembled together.

In this system, there are provided an assembling apparatus for assembling blades with a core for a turbine wheel and an assembling apparatus for assembling blades with a core for a pump wheel with both of the assembling apparatuses being respectively constituted by the above-described workpiece assembling apparatuses. Both of the assembling apparatuses are arranged in parallel at a distance from each other on a side thereof. Circularly disposed groups of stations comprising the charging station, the assembling station, the welding station and the discharging station for each of the assembling apparatuses are arranged in parallel, relative to each of the setting stations, on a laterally inner side of the parallel arrangement of the assembling apparatuses. When each of the charging stations is disposed to face the respective setting station and each of the discharging stations is disposed to look towards a front direction, it becomes possible to discharge the turbine wheel sub-assembly of the blades and the core and the pump wheel sub-assembly of the blades and the core by the discharging units from the discharging stations of both assembling apparatuses to a working place which is disposed towards an intermediate front portion of the parallel arrangement of both assembling apparatuses. At that working place, it becomes possible to assemble a shell with each of the sub-assemblies so that the turbine wheel sub-assembly and the pump wheel sub-assembly are transported as a set from the working place towards the next step. It is therefore possible to lay out the entire system for assembling effectively from a viewpoint of space utilization.

BRIEF DESCRIPTION OF THE DRAWINGS

The above and other objects and the attendant advantages of the present invention will become readily apparent by reference to the following detailed description when considered in conjunction with the accompanying drawings wherein:

FIGS. 6 and 7 are enlarged sectional side views taken along the lines VI—VI and VII—VII, respectively, of FIG. 2.

FIGS. 25(A), (B), (C), (D) and (E) and FIGS. 26(A), (B), (C), (D) and (E) are side views respectively showing the operation of assembling the core.

FIG. 27 is an enlarged side view, partly shown in section, of an important portion of a welding unit.

FIGS. 29 and 30 are sectional side views taken along the lines XXIX—XXIX and XXX—XXX, respectively, of FIG. 28.

FIG. 31 is a side view, partly shown in section, of a discharging unit.

DETAILED DESCRIPTION OF A PREFERRED EMBODIMENT

Figure 1:
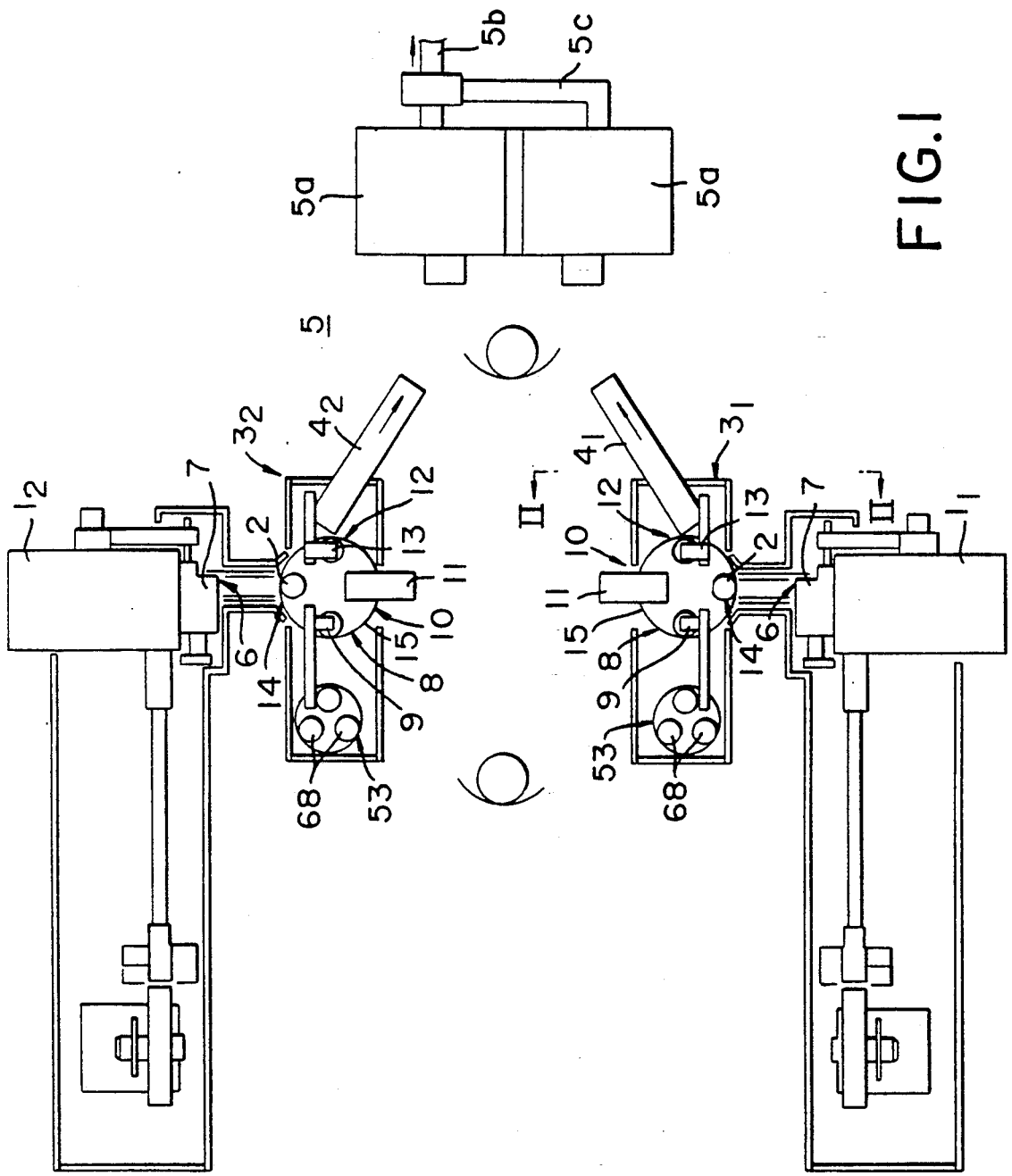
FIG. 1 is a plan view showing the entire system including the apparatus for carrying out the method of this invention.

In the drawings an embodiment of the system of the present invention is shown in which, as shown in FIG. 1, a progressive press machine $1_1$ for pumps which punches blades of pump wheels and a progressive press machine $1_2$ for turbines which punches blades of turbine wheels are provided in parallel with each other with a distance therebetween in the lateral direction. On the laterally inner (of the parallel arrangement) side of each of the press machines $1_1$, $1_2$, a pump wheel assembling apparatus $3_1$, and a turbine wheel assembling apparatus $3_2$ are respectively disposed. (The combination of these two assembling apparatuses $3_1$ and $3_2$ is hereinafter referred to as "a system of assembling workpieces" and is one aspect of the present invention.) In each of the assembling apparatuses $3_1$, $3_2$, blades which have been formed in each of the press machines $1_1$, $1_2$ by pressing are set on a workpiece setting jig 2. The blades which have been set on the workpiece setting jig 2 are assembled with a core and are welded together. The welded subassembly of the blades and the core is discharged towards the laterally central forward direction between the press machines $1_1$, $1_2$. The welded sub-assemblies of the blades and the cores for the pump wheel and for the turbine wheel discharged from the assembling apparatuses $3_1$, $3_2$ are moved via conveyors $4_1$, $4_2$ to a working place 5 which is located forwards (to the right direction in FIG. 1) in a laterally central portion of the parallel arrangement of the assembling apparatuses $3_1$, $3_2$. From a terminal portion of each of the conveyors $4_1$, $4_2$, the welded sub-assemblies of the blades and the cores are taken out by an operator. Shells are assembled with the sub-assemblies on a pair of working tables 5a which are provided in the working place 5, to obtain wheel assemblies. A pump wheel assembly assembled on one of the working tables 5a is transported to a conveyor 5b extending from the other working table 5a by a transport means 5c. Then the pump wheel assembly and a turbine wheel assembly assembled on the other working table 5a are discharged as a set by the conveyor 5b to a brazing station for brazing the shells and the blades together. When each of the conveyors $4_1$, $4_2$ are fully loaded with welded sub-assemblies of the blades and the cores, an unillustrated sensor detects such a condition, so that each of the assembling apparatuses $3_1$, $3_2$ stops operating until needed.

The assembling apparatus $3_1$ for the pump wheel and the assembling apparatus $3_2$ for the turbine wheel are the same in construction. Therefore, an explanation is made hereinbelow only about the assembling apparatus $3_1$ for the pump wheel.

The assembling apparatus $3_1$ for the pump wheel comprises: a workpiece setting apparatus 7 which is disposed in a setting station 6 at the side of the progressive press machine $1_1$; an assembling unit 9 which is disposed in an assembling station 8; a welding unit 11 which is disposed in a welding station 10; and a discharging unit 13 which is disposed in a discharging station 12. A charging station 14 is provided in a position facing the setting station 6 as seen in the direction of moving back and forth (or sending and withdrawing) the workpiece setting jig 2. The charging station 14, the assembling station 8, the welding station 10 and the discharging station 12 are disposed in a circular form. That is, they are grouped together equally spaced around a common axis. Circular guide rails 15 are provided such that they pass through the charging station 14, the assembling station 8, the welding station 10 and the discharging station 12. Jig carts 16 on which the workpiece setting jigs 2 can be mounted are supported on the rails 15. A transferring apparatus 17 is provided for intermittently feeding the jig carts 16 along the rails 15 to the charging station 8, the welding station 10 and the discharging station 12 in that order. In addition, that part of the guide rails 15 which corresponds to the charging station 14 is constructed as movable rails 15a which can be reciprocated between the charging station 14 and the setting station 6.

Figure 10:
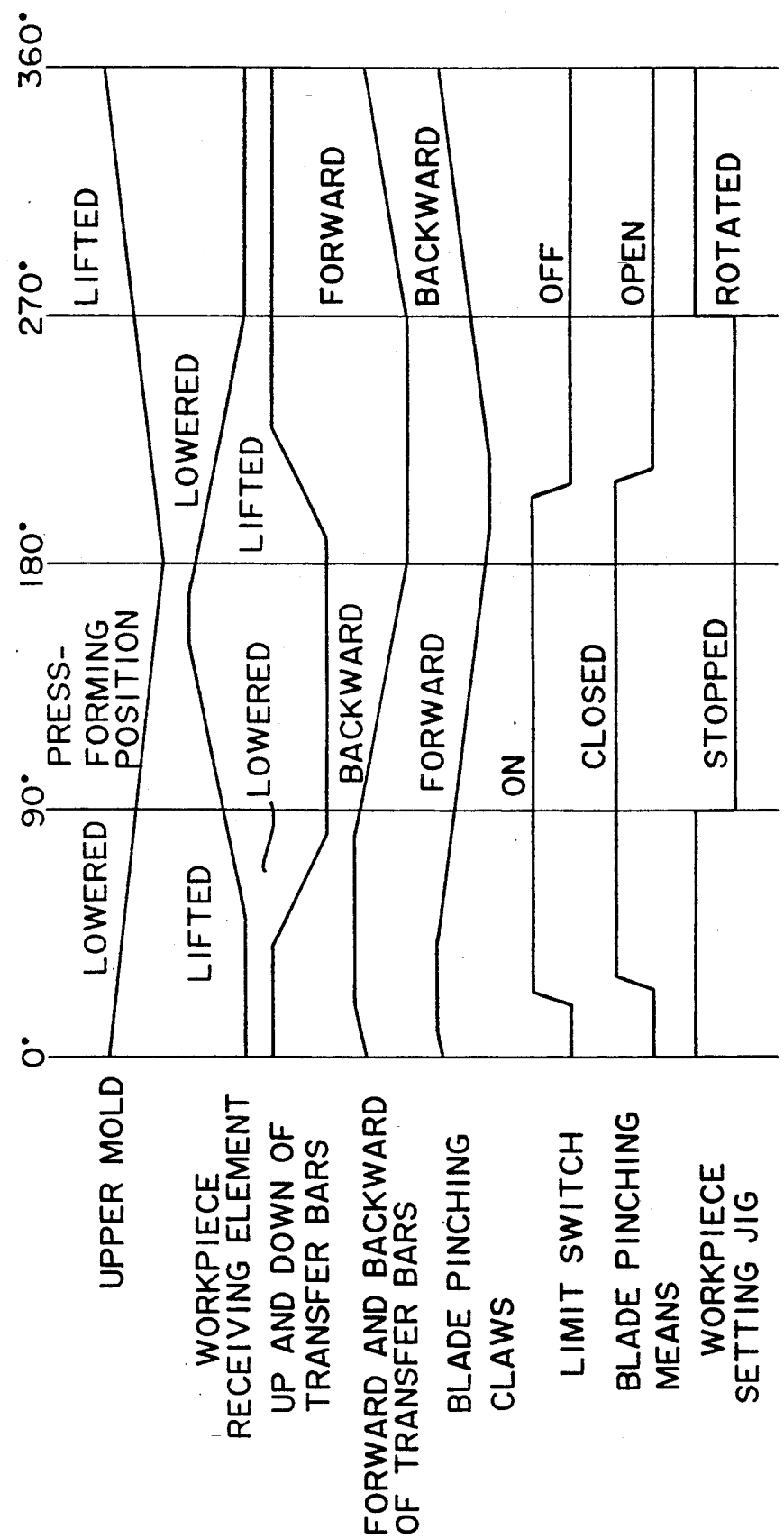
FIG. 10 is a diagram showing the timing of each component member of the workpiece setting apparatus with respect to the rotational angle of a crank shaft of a progressive press machine.

In more detail, as shown in FIGS. 2 through 8, the workpiece setting apparatus 7 comprises: a workpiece receiving member 18 to take out the blades $W_1$, which are press-formed by the progressive press machine $1_1$ through an ejection hole 1b in a lower mold 1a; a discharging apparatus 19 to receive the blades $W_1$ from the workpiece receiving member 18 for discharging them towards a takeout position A (i.e., a position for handing over the blades $W_1$ to the next apparatus) in front thereof; and a transferring apparatus 20 to set the blades $W_1$ at the takeout position A on the workpiece setting jig 2 in front thereof. The workpiece receiving member 18 has, as shown in FIG. 6, a mounting portion 18a on which the press-formed blades $W_1$ can be placed. The workpiece receiving member 18 is supported on a rod 18b which extends downwards through a guide sleeve 18c which is vertically disposed on a base plate 21. The rod 18b is movable upwards, against a return spring 18e in the guide sleeve 18c. Permanent magnets 18g are buried in the mounting portion 18a. A push rod 18f is provided under the base plate 21. The workpiece receiving member 18 can be moved up and down by an interlocking mechanism 22 in an interlocking relationship with the upward and downward movements of an upper mold 1c of the transfer press machine $1_1$ in a timing as shown in FIG. 10.

Figure 2:
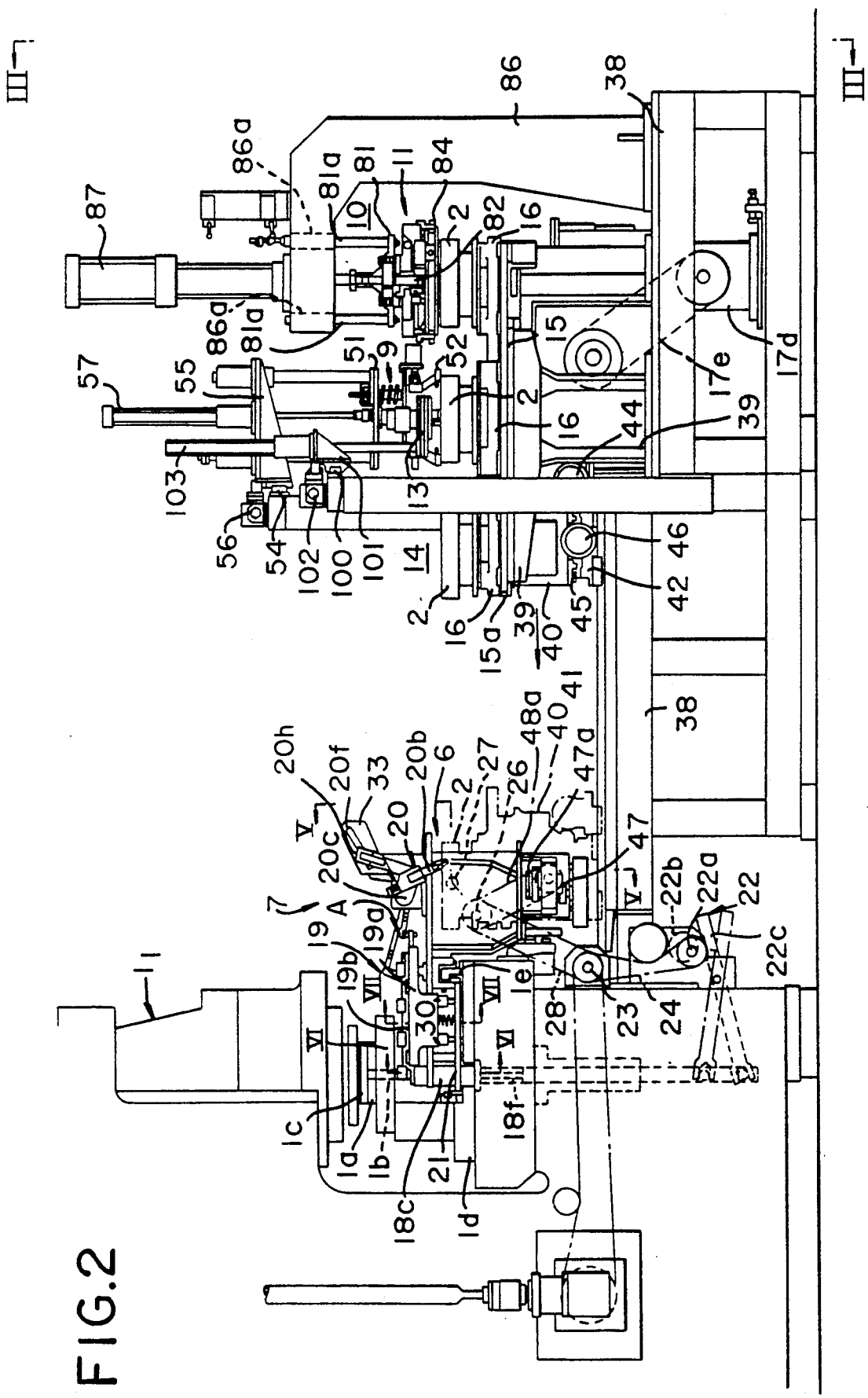
FIG. 2 is a side view as seen from the line II—II of FIG. 1.
Figure 3:
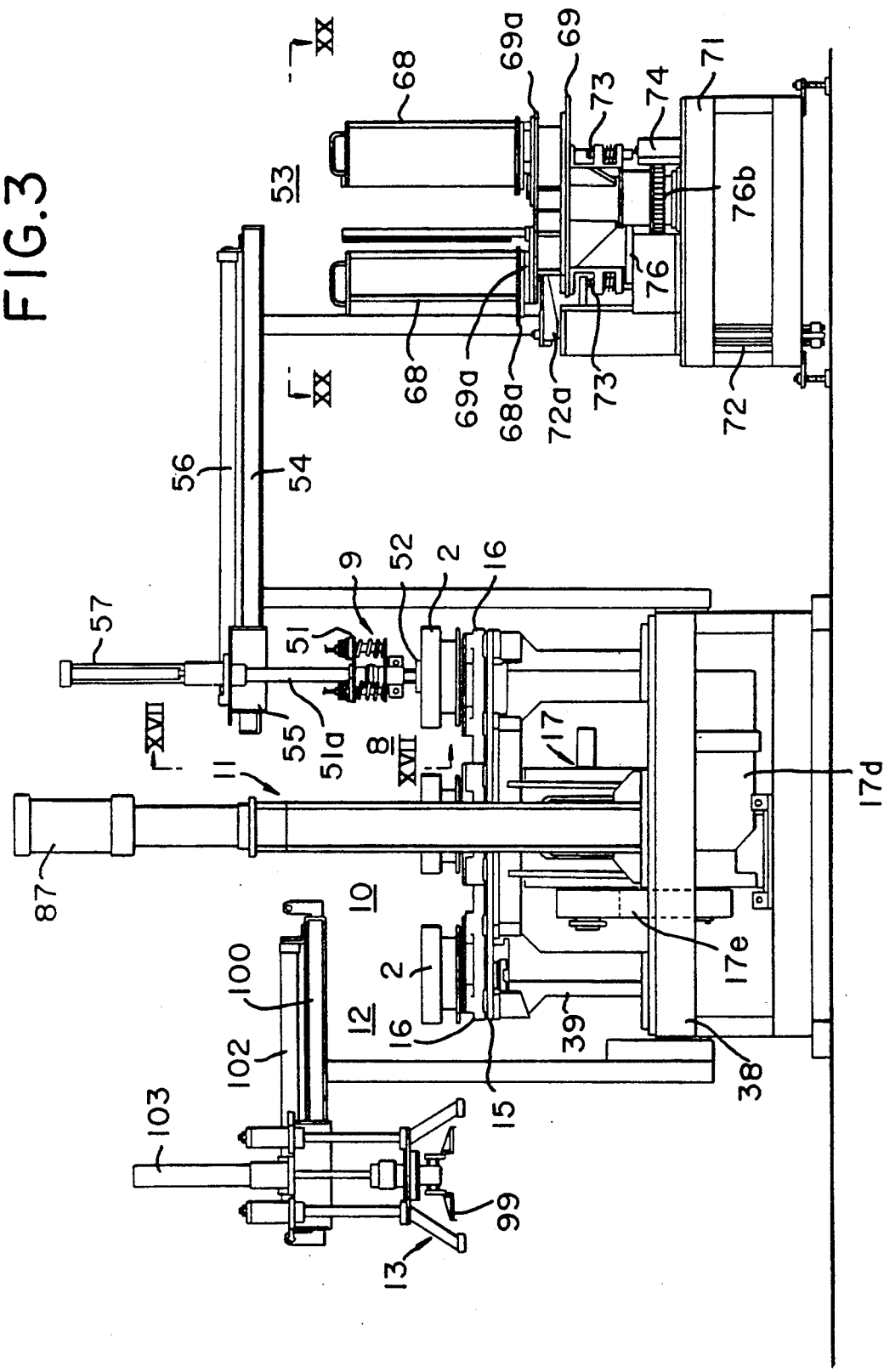
FIG. 3 is a side view as seen from the line III—III of FIG. 2.

The interlocking mechanism 22 comprises, as shown in FIG. 2, an eccentric cam 22b which is fixed on a cam shaft 22a and a rocking lever 22c. The cam shaft 22a is connected, via a toothed belt 24, to a drive shaft 23 which is connected to an unillustrated mechanism which includes an electric motor for moving an upper mold 1c of the transfer press machine $1_1$ up and down. One end of the rocking lever 22c is engaged with the cam 22b and the other end thereof is connected to a lower end of the push rod 18f. The workpiece receiving member 18 is thus lifted through the ejection hole 1b in the lower mold 1a via the rocking lever 22c and the push rod 18f by rotating the eccentric cam 22b. By the lowering of the upper mold 1c, the press-formed blades $W_1$ are received on the mounting portion 18a of the workpiece receiving member 18. The blades $W_1$ are then discharged downwards by the lowering of the workpiece receiving member 18.

Figure 4:
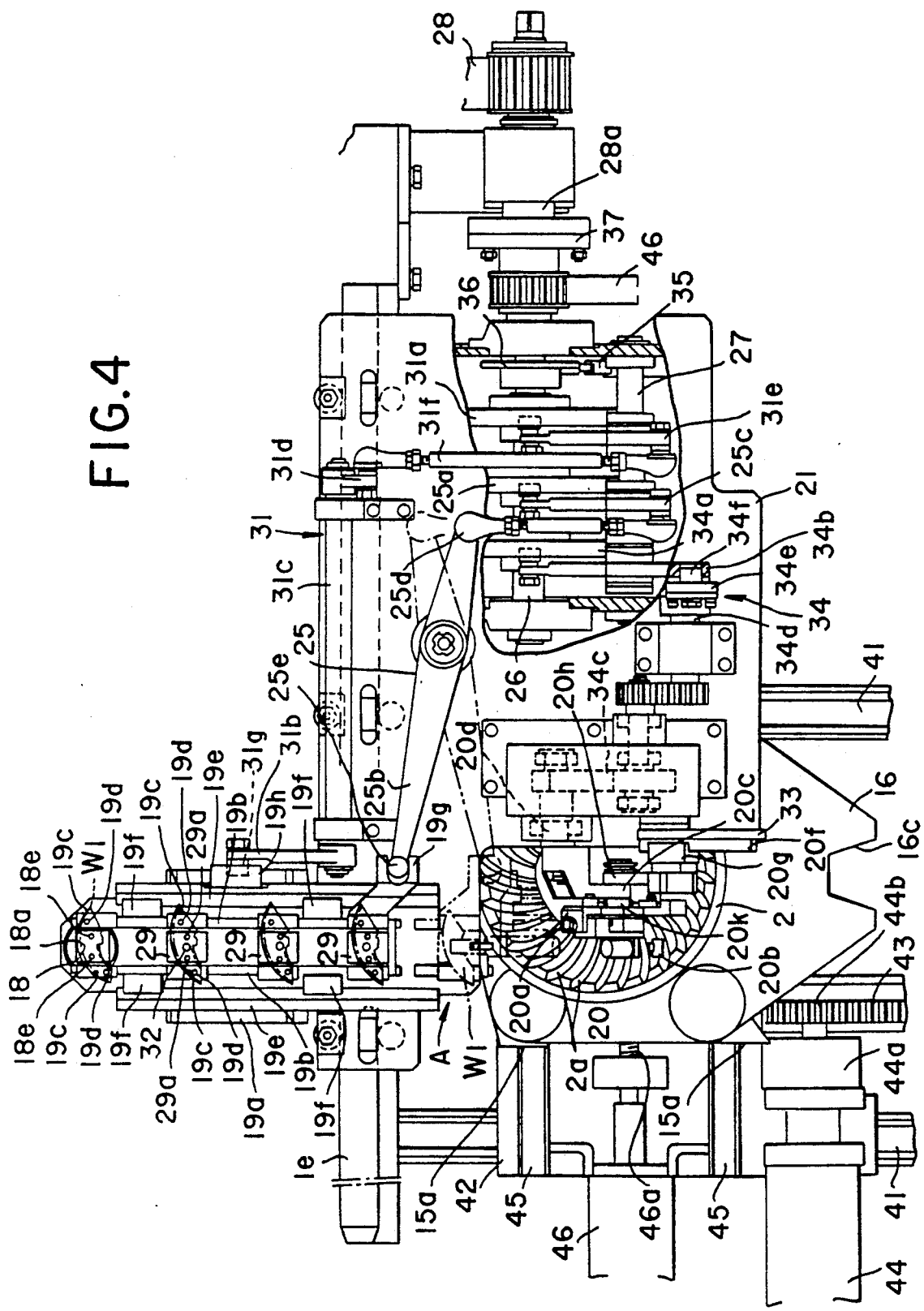
FIG. 4 is a plan view of a workpiece setting apparatus in a condition in which a workpiece setting jig has been moved to a setting station.

The discharging apparatus 19 includes, as shown in FIGS. 2, 4 and 7, a pair of right and left transfer bars 19b, 19b on a supporting frame 19a which serve as a supporting means for the workpieces, such that the transfer bars can move back and forth. Receiving portions 19c to support the blades $W_1$ from below at the right and the left sides thereof, are provided on each of the upper surfaces of the transfer bars 19b, 19b. Permanent magnets 19d are buried in the receiving portions 19c.

Longitudinally extending rails 19e are provided on the inner surfaces of the right and left side walls of the supporting frame 19a. The transfer bars 19b, 19b are supported by sliding blocks 19f which are fixed to the side surface of each of the transfer bars 19b, 19b and which engage the rails 19e. In this manner, the transfer bars 19b, 19b can be reciprocated by an interlocking mechanism 25 back and forth between the position right below the lower mold 1a and the takeout position A in front thereof in an interlocking relationship with the upward and downward movements of the upper mold 1 in a timing as shown in FIG. 10.

Figure 5:
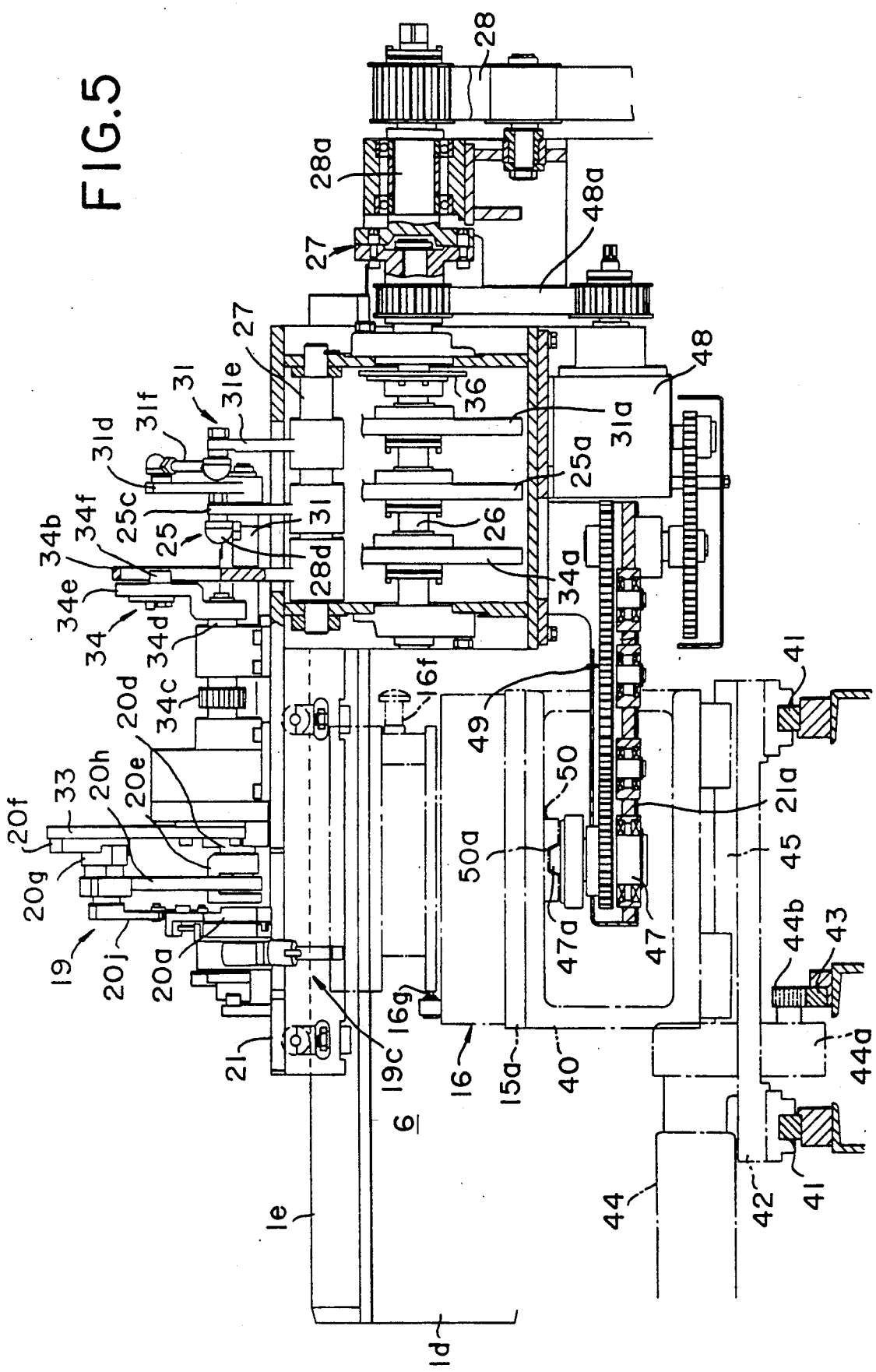
FIG. 5 is a sectional side view taken along the line V—V of FIG. 2.

The interlocking mechanism 25 comprises, as shown in FIGS. 4 and 5, a grooved cam 25a fixed to a cam shaft 26 which is laterally provided on the base plate 21, and a rocking lever 25b which rocks back and forth in an interlocking relationship with the grooved cam 25a. An L-shaped lever 25c is rotatably supported by a supporting shaft 27 which is provided above the cam shaft 26, and one end of the L-shaped lever 25C is engaged with the groove of the grooved cam 25a via a roller and the other end thereof is connected to one end of the lever 25b via a link 25d. The cam shaft 26 is connected to the drive shaft 23 via a toothed belt 28 and a counter shaft 28a. The other end of the rocking lever 25b is engaged with an engaging groove of an arm 19g which extends sideways from one of the transfer bars 19b, 19b. In this manner, the transfer bars 19b, 19b can be moved back and forth through the rotation of the cam shaft 26 via the grooved cam 25a, the L-shaped bar 25c, the link 25d and the lever 25b.

In this case, since the distance between the position right below the workpiece receiving member 18 and the takeout position A is long, in order to move the transfer bars 19b, 19b quickly interlocking with the upward and downward movements of the upper mold 1c, the interlocking mechanism 25 would become large and difficulties might be encountered due to a large force of inertia.

Therefore, in the preferred embodiment, the discharging mechanism 19 and the interlocking mechanism 25 have been so arranged that they can be made smaller by reducing the stroke of the transfer bars 19b, 19b.

Namely, between the position right below the workpiece receiving member 18 and the takeout position A, three receiving elements 29 each of which are provided with vacuum holes 29a for attractively holding the blades $W_1$, are disposed at an equal distance therebetween. The supporting frame 19a is mounted on the base plate 21 for upward and downward movements by supporting it with guide rods 30. The transfer bars 19b, 19b are moved up and down by an interlocking mechanism 31 via the supporting frame 19a in an interlocking relationship with the upward and downward movements of the upper mold 1c in a timing as shown in FIG. 10. In this manner, the blades $W_1$ which are received from the workpiece receiving member 18 are sequentially moved by one pitch each time towards the front direction.

The interlocking mechanism 31 comprises a grooved cam 31a which is fixed to the cam shaft 26, and a lever 31b which is rocked up and down by the grooved cam 31a. A lever shaft 31c is laterally provided on the base plate 21. The lever 31b is mounted on one end of the lever shaft 31c, and an arm 31d is mounted on the other end thereof. One end of an L-shaped lever 31e which is rotatably supported by the supporting shaft 27 is engaged with a cam groove of the grooved cam 31a and the other end thereof is connected to the arm 31d via a link 31f. The lever 31b is engaged with a grooved member 19h on the side surface of the supporting frame 19a. In this manner, upward and downward movements are given to the supporting frame 19a via the L-shaped lever 31e, the arm 31d and the lever 31b through the rotation of the grooved cam 31a.

A detection switch 32 is provided in each of the receiving elements 29 for detecting the presence or absence of a blade $W_1$ thereon.

Figure 8:
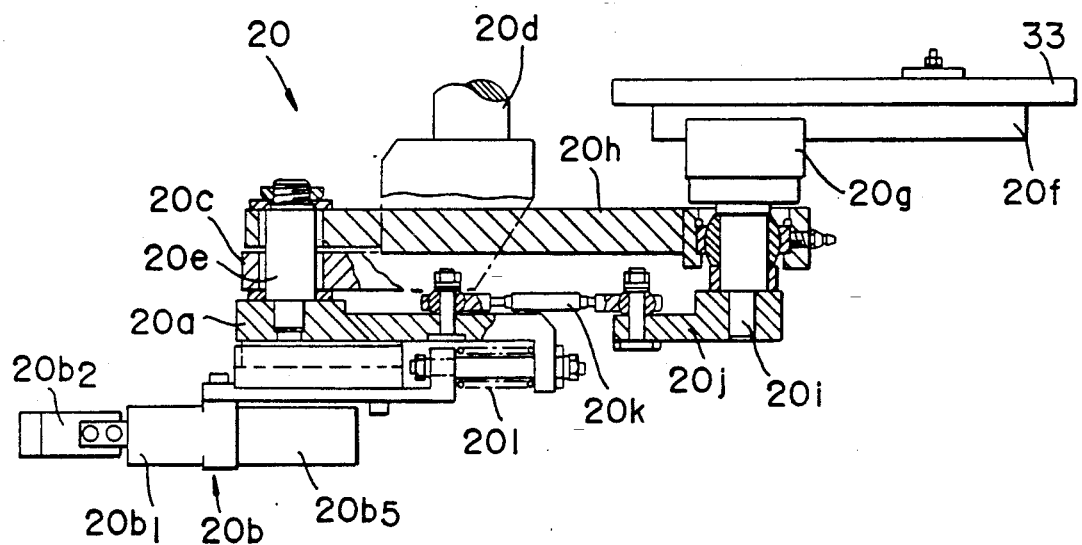
FIG. 8 is a sectional plan view of a transferring apparatus.
Figure 9:
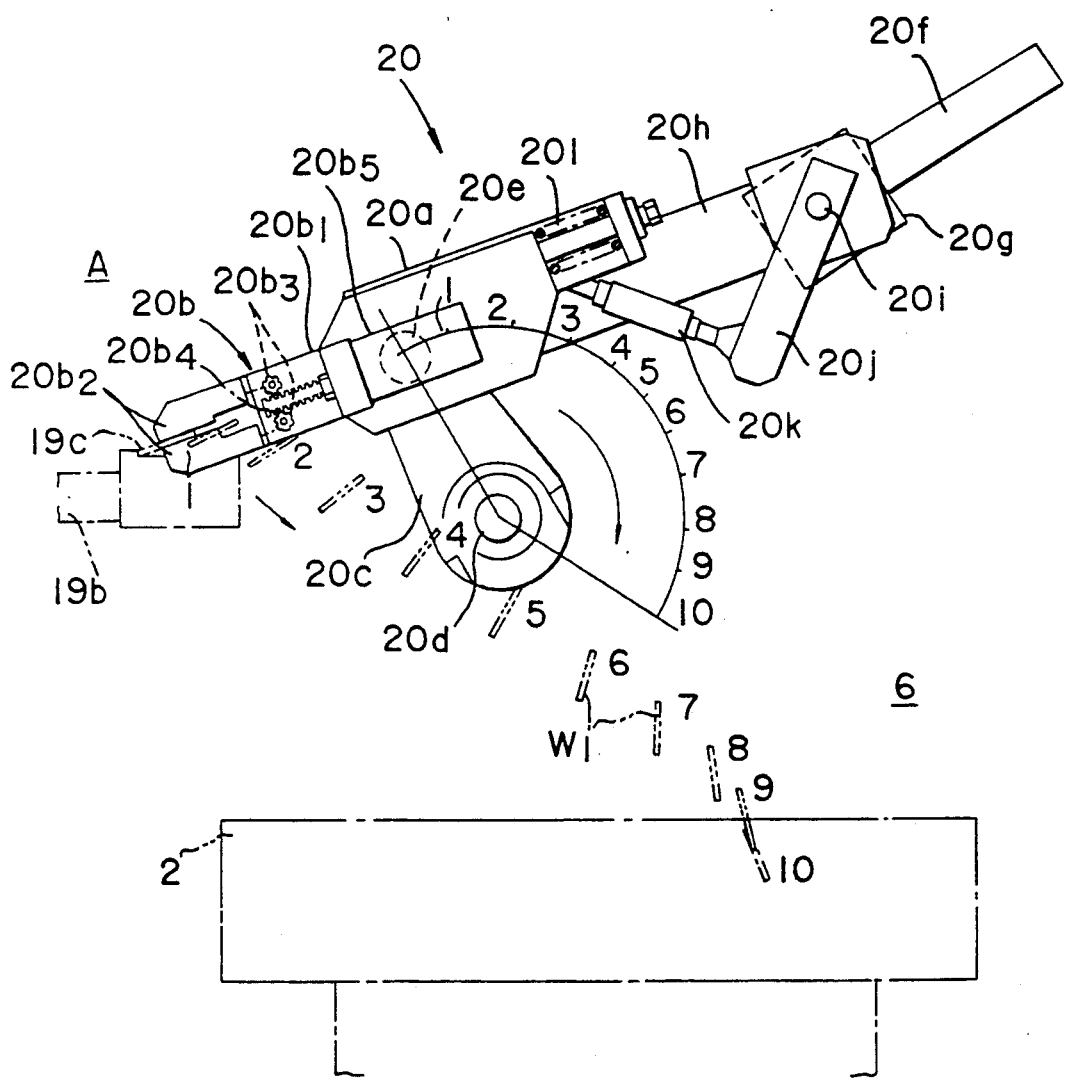
FIG. 9 is a side view showing the movement path of a blade pinching means of the transferring apparatus.

The transferring apparatus 20 comprises, as shown in FIGS. 8 and 9, a pinching means 20b which detachably pinches a blade $W_1$ and which is provided at the rear end of a movable frame 20a which can be reciprocated between the takeout position A and a position above the workpiece setting jig 2. An arm shaft 20d having a crank arm 20c is laterally provided on the base plate 21. An intermediate portion of the movable frame 20a is rotatably supported on the supporting shaft 20e provided on the crank arm 20c. A rail 20f which extends forwards and upwards is fixed to a bracket 33 which is vertically provided on the front side surface of the base plate 21. A sliding member 20g is slidably supported on the rail 20f. The movable frame 20a and the sliding member 20g are connected together via a first link 20h. A fixed arm 20j which extends downwards and backwards is fixed to a supporting shaft 20i of the first link 20h. The supporting shaft 20i is fixed to the sliding member 20g. The fixed arm 20j and the front portion of the movable frame 20a are connected together via a second link 20k. The second link 20k is so arranged that an extended axial line thereof passes above the supporting shaft 20e which rotatably supports the movable frame 20a on the crank arm 20c. The blades $W_1$ to be discharged by the transfer bars 19b, 19b at the takeout position A are pinched by the blade pinching means 20b while the movable frame 20a is held in a substantially horizontal posture as shown by thick lines in FIG. 9. The crank arm 20c is then turned forwards. Thus, the sliding member 20g moves linearly forwards and upwards via the first link 20h, and the first link 20h is turned about the supporting shaft 20i relative to the sliding member 20g. Consequently, the angle between the fixed arm 20j and the first link 20h is narrowed. As shown in FIG. 2, the movable frame 20a is caused to turn relative to the crank arm 20c via the second link 20k such that the rear end of the pinching means 20b faces downwards.

Through the downward movement of the movable frame 20a by the rotary movement of the crank arm 20c and the rotation of the movable frame 20a relative to the crank arm 20c, the blades $W_1$ are inserted into the setting jig 2 from an upper position in a condition in which the front edges of the blades $W_1$ face rearward and upwards as shown in imaginary lines 1 through 10 in FIG. 9.

Furthermore, an interlocking mechanism 34 for the transferring apparatus is provided, the interlocking mechanism operating the crank arm 20c in an interlocking relationship with the up and down movements of the upper mold 1c in a timing as shown in FIG. 10. This interlocking mechanism 34 comprises a grooved cam 34a which is fixed to the cam shaft 26, and an L-shaped lever 34b which is rotatably supported on the supporting shaft 27. A lever shaft 34d, which is connected to the arm shaft 20d of the crank arm 20c via a gear mechanism 34c, is provided on the base plate 21. One end of the L-shaped lever 34b is engaged with the grooved cam 34a, and a slot formed at the other end thereof is engaged with a lever 34e mounted on the lever shaft 34d, via a roller 34f. In this manner, the crank arm 20c is caused to swing by the rotation of the cam shaft 26 via both levers 34b, 34e and the gear mechanism 34c. As shown in FIG. 9, the blades $W_1$ transferred to the takeout position A by the transfer bars 19b, 19b are pinched by the blade pinching means 20b and are set one by one on the workpiece setting jig 2 in the workpiece setting station 6.

The workpiece setting jig 2 is provided with a number of inserting grooves 2a which are adapted to hold the blades $W_1$ in the same posture as that in which the blades $W_1$ are assembled to the shell of the wheel.

The blade pinching means 20b comprises a pair of pinching claws $20b_2$, $20b_2$ which are rotatably provided at an end of the pinching means main body $20b_1$. A pinion gear $20b_3$ is fixed to a rotary shaft portion of each of the pinching claws $20b_2$, $20b_2$. A rack $20b_4$ engaging with both pinion gears $20b_3$, $20b_3$ is connected to a piston rod of an air cylinder $20b_5$. In this manner, both pinching claws $20b_2$, $20b_2$ can be opened and closed by the operation of the air cylinder $20b_5$.

A limit switch 35 is provided to control in an ON-OFF manner, an unillustrated solenoid valve interposed in the air supply passage for the air cylinder $20b_5$. An actuating cam 36 to operate the limit switch 35 in an ON-OFF manner is fixed to the cam shaft 26, as shown in FIG. 4. The limit switch 35 is thereby operated by the actuating cam 36 in an interlocking relationship with the up and down movements of the upper mold 1c in a timing as shown in FIG. 10 so that both pinching claws $20b_2$, $20b_2$ are opened and closed in an interlocking relationship with the up and down movements of the upper mold 1c.

The blade pinching means 20b is slidably mounted on the movable frame 20a and is biased by a spring 20l. In this manner, no excessive force is exerted on the transferring apparatus 20 when each blade $W_1$ abuts the workpiece setting jig 2 while inserting the blade $W_1$ into the setting jig 2.

The base plate 21 is supported by a rail 1e which is provided on a bolster 1d of the progressive press machine $1_1$. As shown in FIG. 5, the cam shaft 26 and the counter shaft 28a are connected together via a detachable coupling 37 so that the entire workpiece setting apparatus 7 can be withdrawn sideways together with the base plate 21 relative to the progressive press machine $1_1$, thus improving the ease with which the maintenance can be performed on the workpiece setting apparatus 7.

The guide rails 15 are provided, as shown in FIGS. 11 through 14, as an inner and outer pair on a rail frame 39 on an apparatus base 38. Each jig cart 16 includes a frame 16a having a plurality of upper and lower rollers 16b between which the guide rails 15 are pinched and a plurality of rollers 16b' which roll on the peripheral surfaces of the guide rails 15. An index unit constituting the transferring apparatus 17 is disposed in the central part of the guide rails 15. A plate 17c having four arms 17b engaged with an engaging grooves 16c provided in the frame 16a of each jig cart 16 is provided on an output shaft 17a of the index unit. A toothed belt 17e is wound around a pulley on an input shaft of the index unit and a pulley on an output shaft of an electric motor 17d mounted on the apparatus base 38. By the operation of the electric motor 17d, each jig cart 16 can be intermittently fed via the respective arm 17b of the index unit to the charging station 14, the assembling station 8, the welding station 10 and the discharging station 12 in that order.

Figure 13:
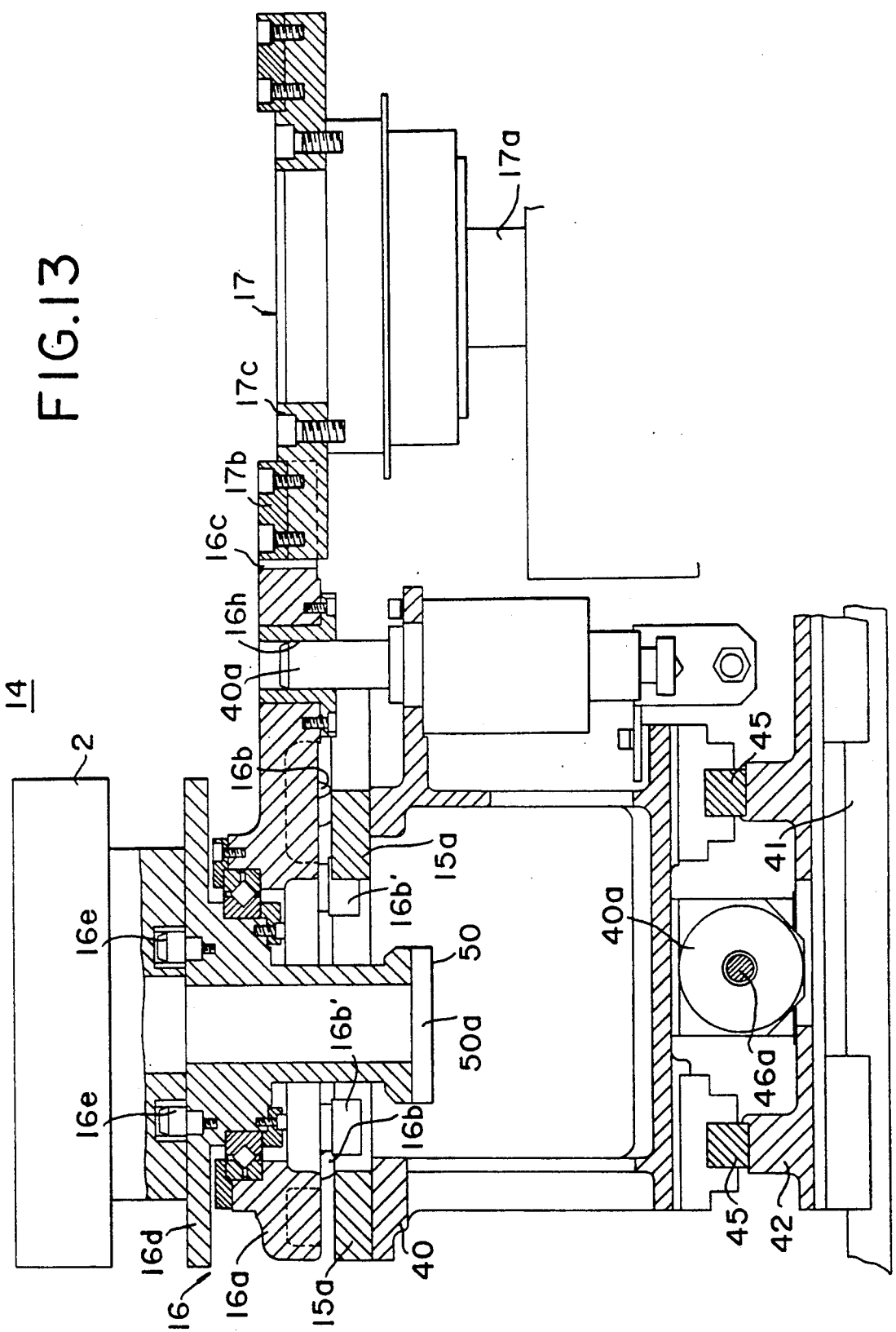

The movable rail 15a is mounted on a movable frame 40. A positioning pin 40a which can be projected upwards is vertically provided on the movable frame 40, as shown in FIG. 13. An engaging hole 16h is provided in the frame 16a of the jig cart 16. The jig cart 16 is thus positively positioned relative to the movable frame 40 by the engagement of the pin 40 with the engaging hole 16h. A movable base 42 underneath the movable frame 40 is slidably supported on travelling rails 41 which are laid between the charging station 14 and the setting station 6. A rack 43 is provided on the apparatus frame 38. The rack 43 is engaged by a pinion gear 44b which is connected via a reduction gear 44a to an output shaft of an electric motor 44 mounted on the movable base 42. By the operation of the electric motor 44, the movable frame 40 via the movable base 42 is given a reciprocating movement between the charging station 14 and the setting station 6.

Longitudinal rails 45 extending in the front and rear direction are provided on the movable base 42. The movable frame 40 is slidably supported on the rails 45. A threaded bar 46a which is connected to an output shaft of a second electric motor 46 is provided on the movable base 42. A nut sleeve 40a fixed on the movable frame 40 is engaged in a threaded manner with the threaded bar 46a. By the rotation of the electric motor 46 in one direction and the opposite direction, the movable frame 40 is given a movement in the forward and backward directions so that the position of the workpiece setting jig 2 relative to the workpiece setting apparatus 7 in the setting station 6 can be changed over depending on the kind and model of workpieces.

In the setting station 6, there is provided, as shown in FIG. 5, an index shaft 47 for rotating the workpiece setting jig 2 which is mounted on the jig cart 16 on the movable rails 15a of the movable frame 40. The index shaft 47 is supported by a bracket 21a under the base plate 21. An index unit 48 is provided under the base plate 21. A toothed belt 48a is wound around a pulley on the input shaft of the index unit 48 and a pulley at an end of the cam shaft 26. A drive gear on the output shaft of the index unit 48 and a driven gear on the external periphery of the index shaft 47 are connected together via a gear train 49. An engaging piece 47a is provided on the index shaft 47, the engaging piece 47a engaging with an engaging groove 50a of a clutching piece 50 which is explained hereinbelow.

Figure 11:
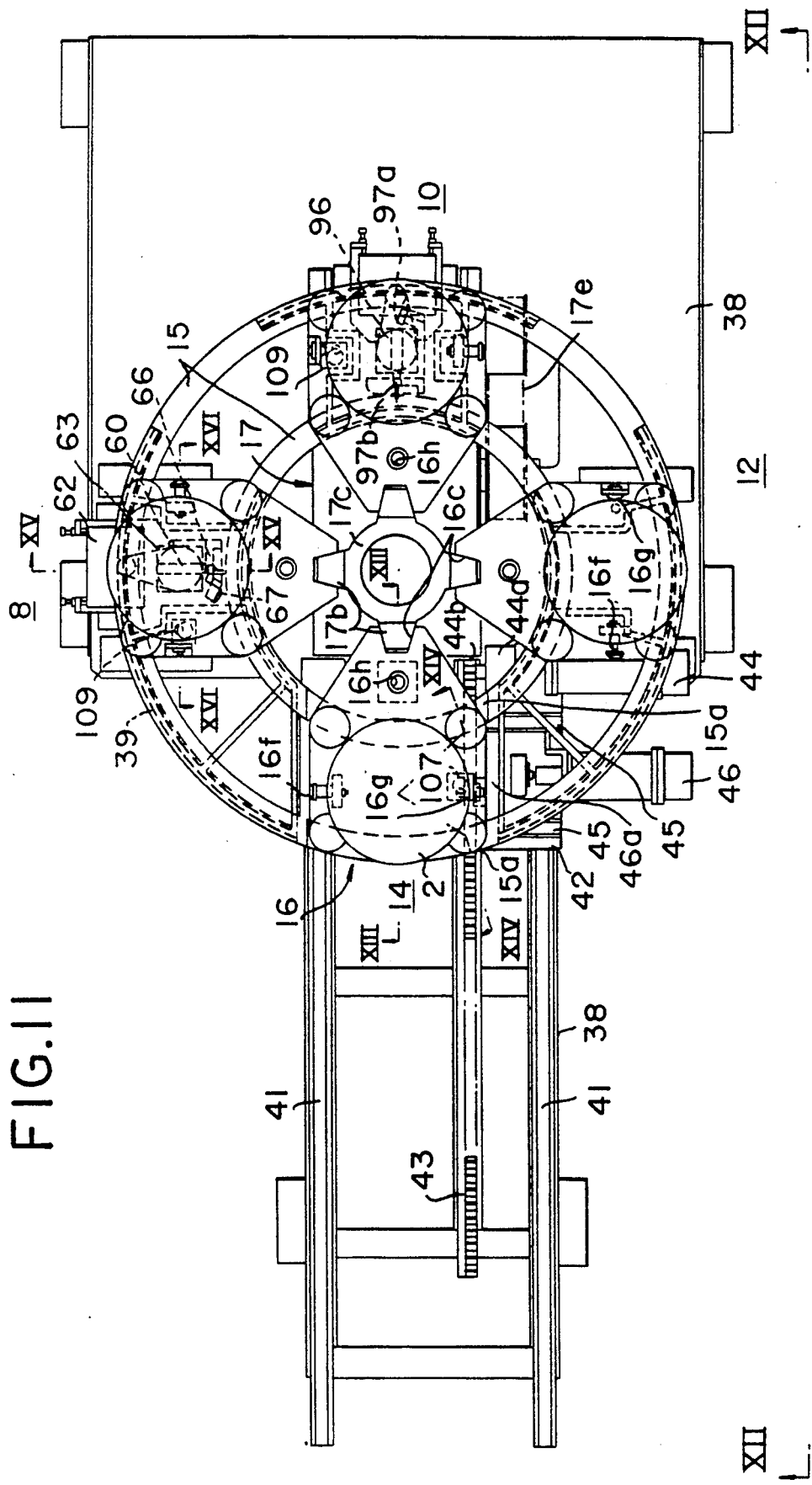
FIG. 11 is a plan view of guide rails.

The clutching piece 50 is provided, as shown in FIG. 13, at the bottom of the shaft of a rotatable table 16d which is rotatably supported on the frame 16a of the jig cart 16. The workpiece setting jig 2 is positioned on the table 16d by two pins 16e, 16e which are vertically provided on the table 16d and a locking screw 16f which is provided at a side of the table 16d as shown in FIG. 11. Thus when the workpiece setting jig 2 on the jig cart 16 is moved to the setting station 6 via the movable frame 40, the clutching piece 50 of the rotatable table 16d is engaged with the engaging piece 47a of the index shaft 47 so that an index rotation is given to the workpiece setting jig 2 by the index unit 48 in an interlocking relationship with the up and down movements of the upper mold 1c in a timing as shown in FIG. 10.

The rotatable table 16d is maintained in a phase in which the engaging groove 50a of the clutching piece 50 is aligned in a longitudinal direction of the travelling rails 41, i.e., in the original phase, by means of click balls 16g which are provided on the frame 16a.

The assembling unit 9 comprises, as shown in FIGS. 3 and 17 through 19, a core pinching means 52 which detachably pinches a core $W_2$ and which is provided on a lifting frame 51. A rail 54 extends from an upper position of the assembling station 8 towards an upper position of a core feeding station 53 at the rear thereof. A sliding member 55 is supported by the rail 54. A movable part 56a of a rodless cylinder 56 is engaged with a projection 55a of the sliding member 55. A pair of guide rods 51a, 51a are vertically provided on the lifting frame 51. Slide bearings 55a are provided on the sliding member 55 and the rods 51a, 51a are inserted through the bearings. A piston rod of an air cylinder 57 which is vertically provided on the sliding member 55 is connected to the lifting frame 51. Thus the lifting frame 51 is given up and down movements by the operation of the air cylinder 57, and is given reciprocating movements between the assembling station 8 and the core feeding station 53 by the operation of the rodless cylinder 56.

Figure 17:
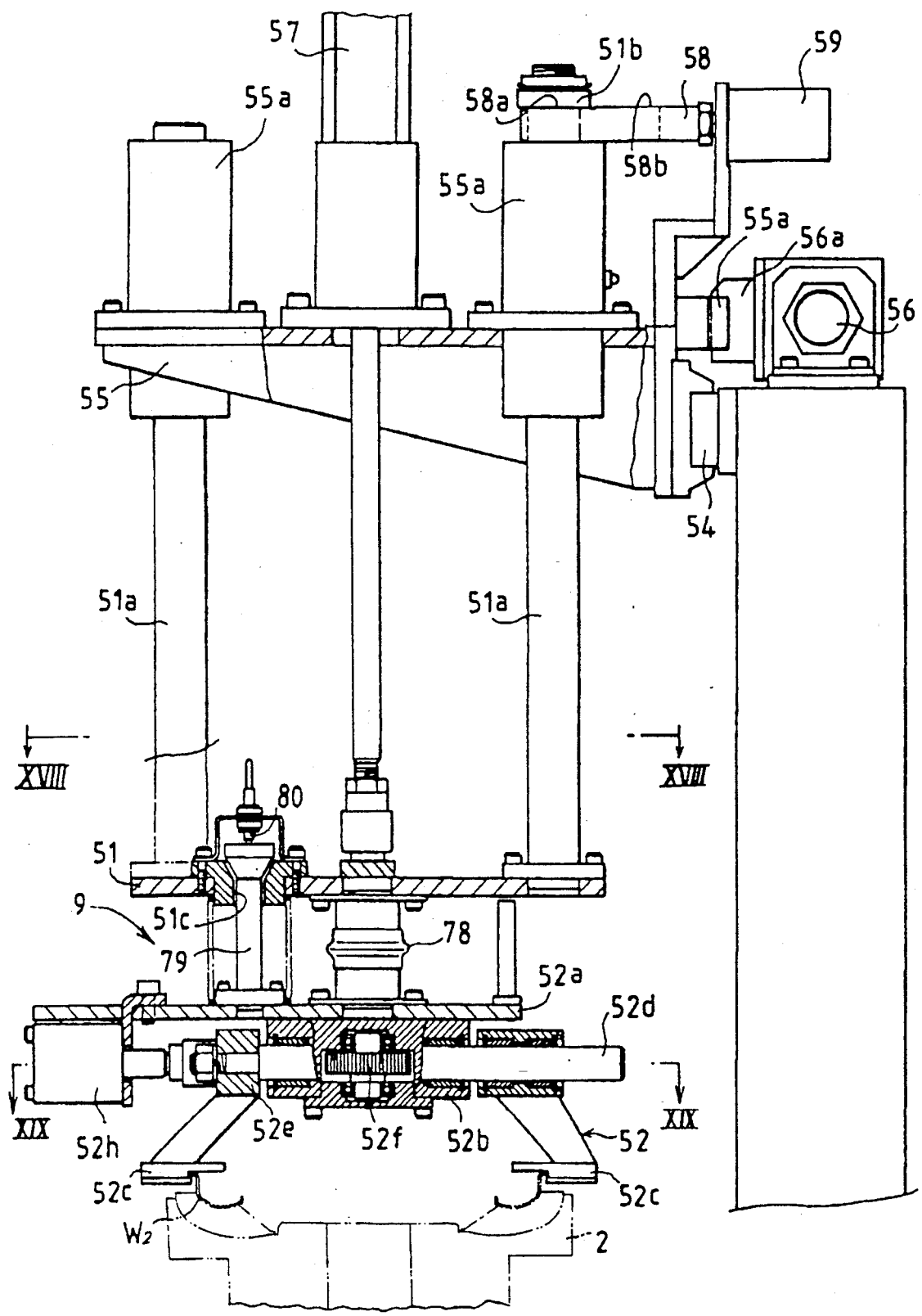
FIG. 17 is an enlarged side view, with an important portion shown in section, as seen from the line XVII—XVII of FIG. 3.

In the illustrated embodiment, as shown in FIG. 17, a stopper 58 is provided at an upper end of one of the slide bearings 55a which is contacted by a flange 51b of the guide rod 51a inserted into the slide bearing 55a. On the stopper 58, two different stopper surfaces 58a, 58b having different heights are formed. A piston rod of a changeover cylinder 59 which is provided on the sliding member 55 is connected to the stopper 58. In this manner, by the operation of the cylinder 59, the stopper 58 is moved between a condition in which one stopper surface 58a faces the flange 51b and another condition in which the other stopper surface 58b faces the flange 51b. Therefore, adjustments can be made of the position of the lifting frame 51 relative to the blades $W_1$ on the workpiece setting jig 2 which is stopped at a predetermined position in the assembling station 8. In other words, the lowered position of the core $W_2$ pinched by the core pinching means 52 can be changed over depending on the kind and model of the workpieces.

Figure 19:
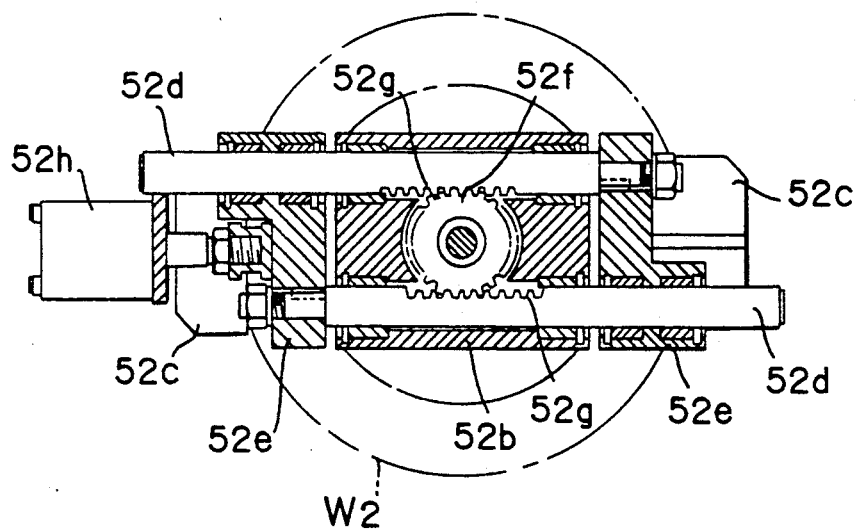

The core pinching means 52 is constructed, as shown in FIGS. 17 and 19, by slidably inserting a pair of guide rods 52d having fixed thereon pinching arms 52c, into a guide block 52b which is mounted on the bottom surface of a supporting plate 52a. The end portions of guide rods 52d which are opposite to each other are slidably inserted into base portions 52e of the pinching arms 52c. A pinion gear 52f is provided in the central portion of the guide block 52b. Rack portions 52g formed on both guide rods 52d are engaged with the pinion gear 52f. A piston rod of an opening and closing cylinder 52h which is mounted on the supporting plate 52a is connected to one of the base portions 52e. In this manner, by the operation of the cylinder 52h, both arms 52c, 52c can open and close in the radial direction of the core $W_2$.

Figure 15:
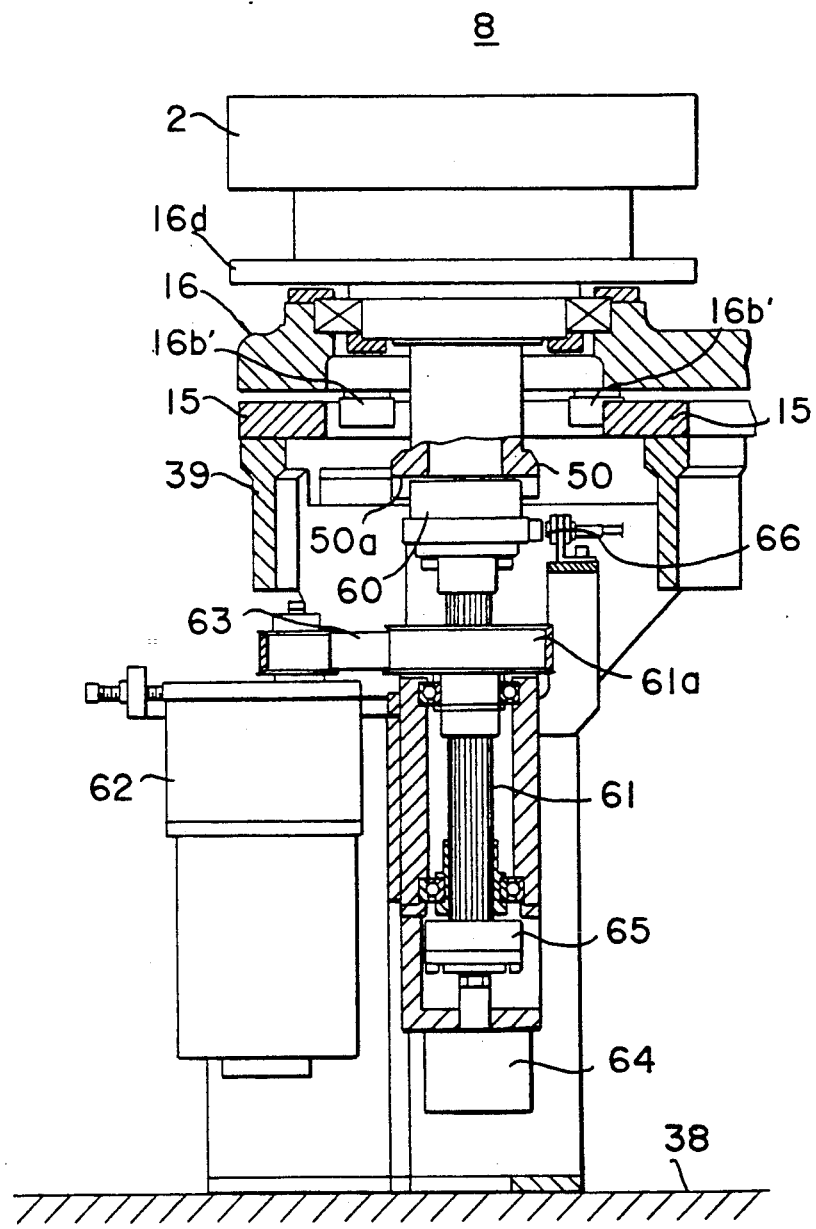
Figure 16:
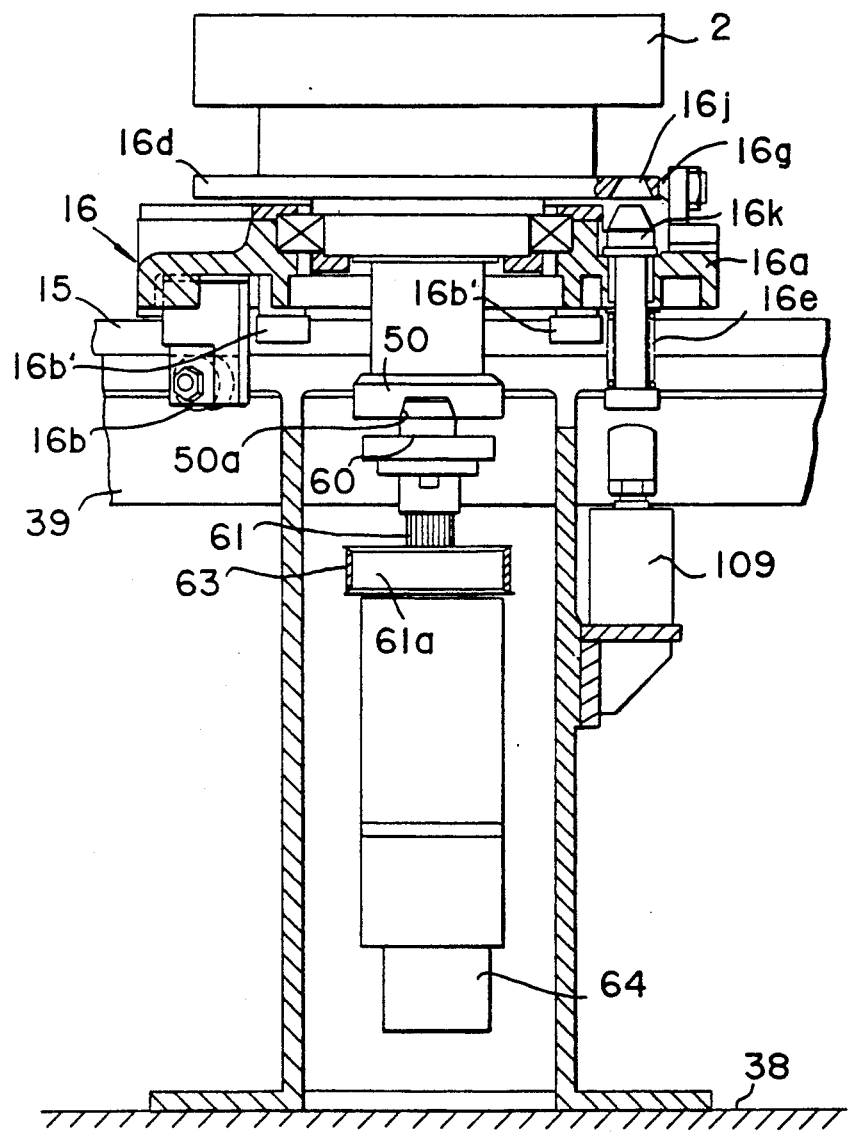

As shown in FIGS. 11, 15, and 16, a rotatable shaft 61 is vertically provided underneath the guide rails 15 at the assembling station 8 having an engaging piece 60 which is engaged with the clutching piece 50 of the rotatable table 16d of the jig cart 16. A toothed belt 63 is wound around a pulley 61a which is engaged by splining with the external periphery of the rotatable shaft 61 and a pulley on an output shaft of an electric motor 62. A cylinder 64 is provided on a lower side of the rotatable shaft 61. The piston rod of the cylinder 64 is connected to a lower end of the rotatable shaft 61 via a rotary joint 65. A proximity switch 66 is provided for stopping the rotatable shaft 61 in a phase in which it is engaged with the clutching piece 50 of the jig cart 16 which has been moved by the transferring apparatus 17. Another proximity switch 67 is provided for detecting the angle of rotation of the rotatable shaft 61. By the operation of the cylinder 64, the rotatable shaft 61 is lifted to engage the engaging piece 60 with the clutching piece 50 and, by the operation of the electric motor 62, the workpiece setting jig 2 on the jig cart 16 at the assembling station 8 can be rotated by a predetermined angle.

Figure 20:
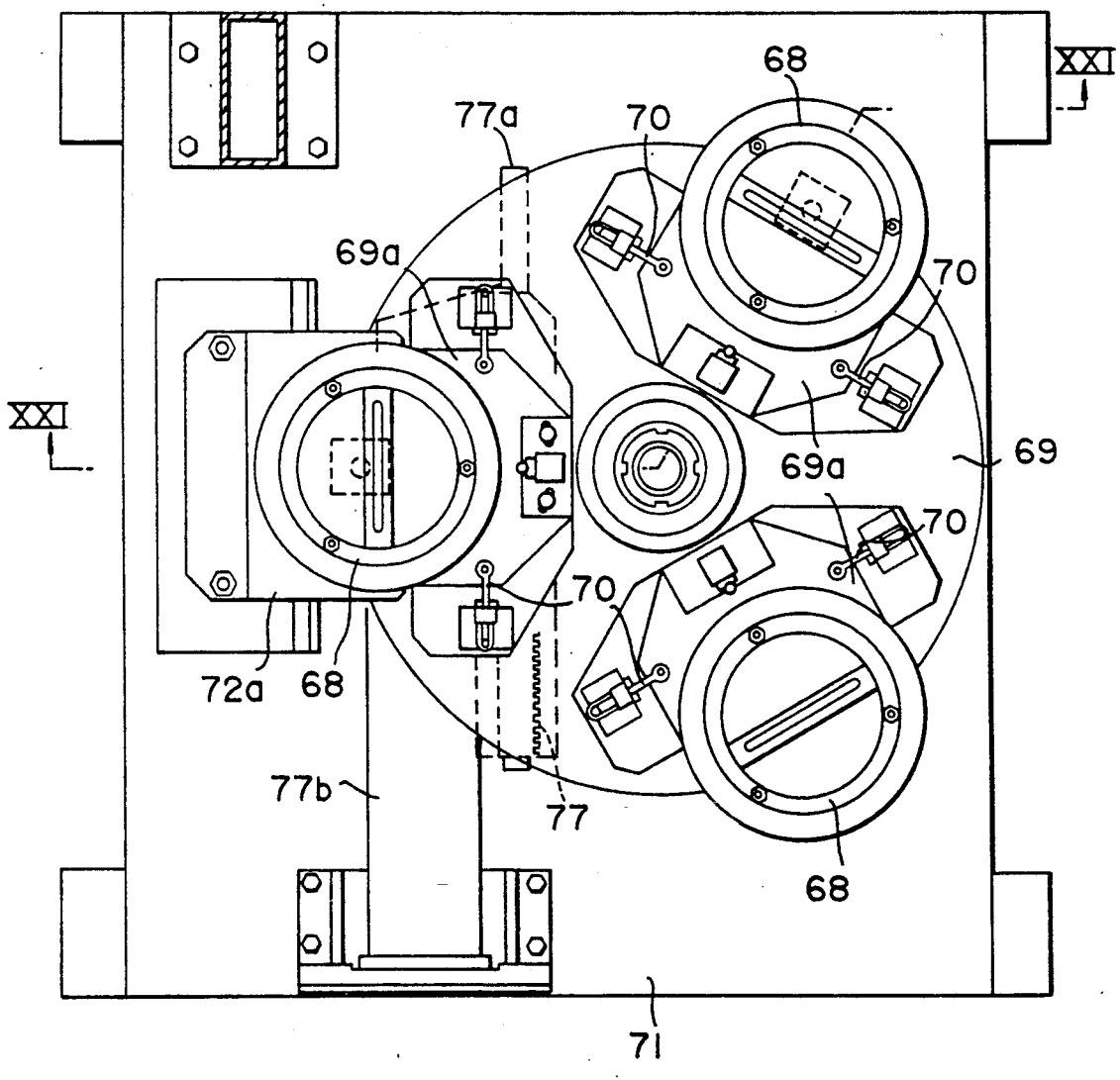
FIG. 20 is a plan view as seen from the line XX—XX of FIG. 3.
Figure 21:
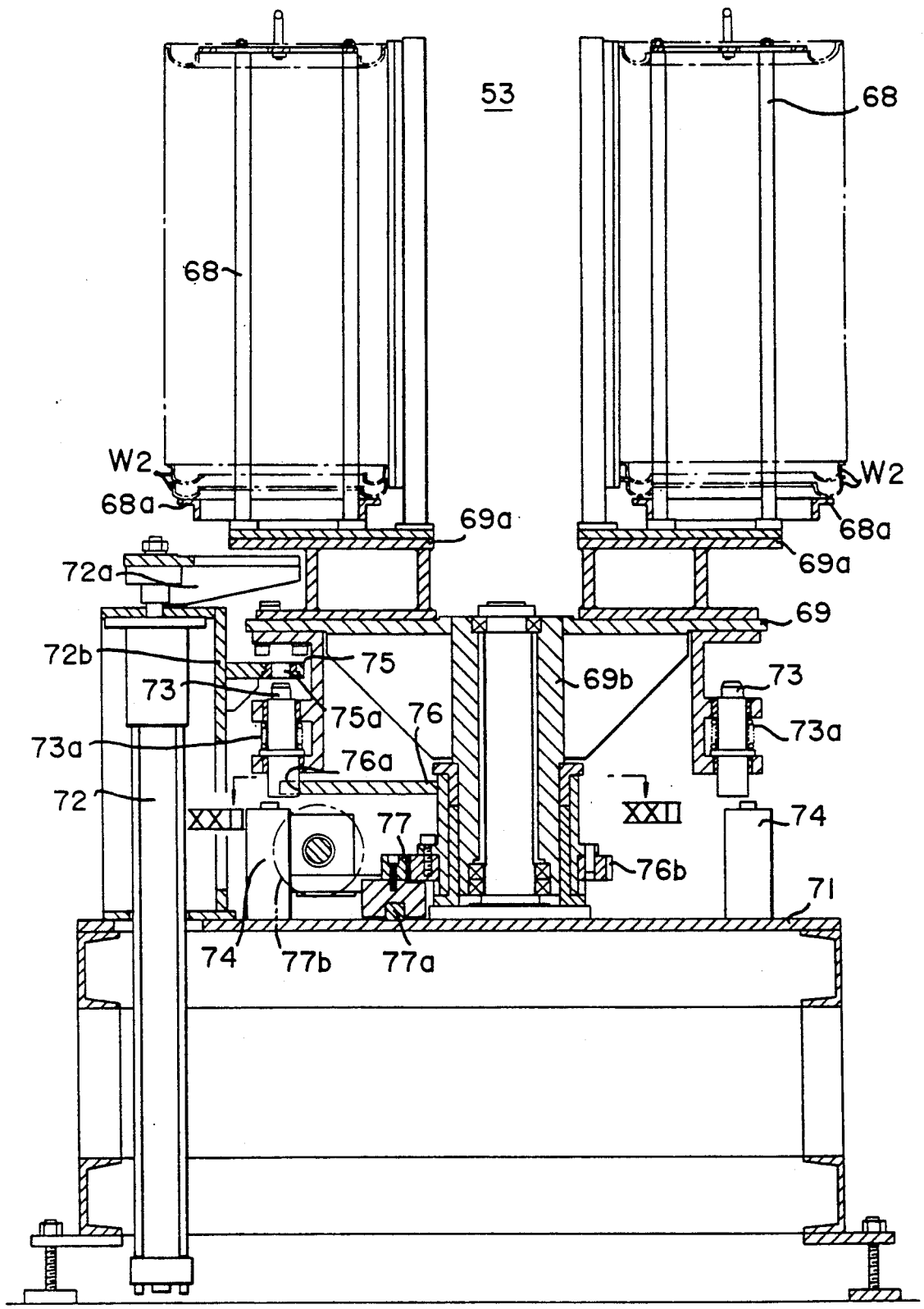
FIG. 21 is a sectional side view taken along the line XXI—XXI of FIG. 20.
Figure 22:
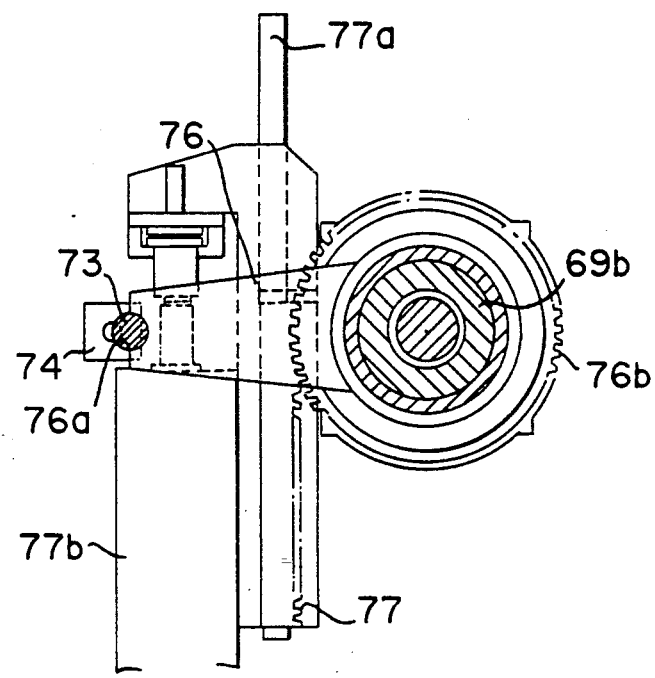
FIG. 22 is a sectional plan view taken along the line XXII—XXII of FIG. 21.

In the core feeding station 53, there are provided, as shown in FIGS. 20 through 22, a rotatable table 69 on which are mounted core magazines 68 having cores $W_2$ stacked therein. Three bases 69a with clamping pieces 70 on which core magazines 68 are mounted are provided on the upper surface of the rotatable table 69 at an equal distance from each other. A lifter 72a which is lifted by a cylinder 72 is provided at a front portion of an apparatus base 71 which rotatably supports the rotatable table 69. The cores $W_2$ in the core magazines 68 can thus be lifted by the lifter 72a via a bottom plate 68a.

Engaging pins 73 which can be lifted against springs 73a are provided in positions right below the bases 69a of the rotatable table 69. Cylinders 74 to lift the engaging pins 73 are provided on the apparatus base 71. A stay 75 having an engaging hole 75a is provided in a projecting manner on the supporting bracket 72b of the cylinder 72 for the lifter 72a which is provided on the apparatus base 71. The engaging pins 73 are lifted for engagement thereof with the engaging holes 75a by the operation of the cylinders 74 so that the rotatable table 69 can be positioned in a phase in which one of the core magazines 68 faces the lifter 72a.

An arm 76 is attached to the external periphery of a cylindrical shaft portion 69b of the rotatable table 69 so as to be rotatable table relative to the cylinder shaft portion 69b. An indented portion 76a is formed at the tip of the arm 76 with which one of the pins 73 carried by the rotatable table 69 engages when it is in a lowered condition. A slidably mounted rack 77 which is slid back and forth by a cylinder 77b along a rail 77a is provided on the apparatus base 71. A pinion gear 76b on the external periphery of the cylindrical shaft portion of the arm 76 is engaged with the rack 77. By the operation of the cylinder 77b in the extending direction when one of the pins is engaged with the indented portion 76a on the tip of the arm 76, a rotation of 120 degrees each is given to the rotatable table 69 via the arm 76 and the engaging pin 73 engaged therewith.

While the engaging pins 73 are lifted for positioning the rotatable table 69 relative to the lifter 72a and thus are not engaged with the indented portion 76a, the cylinder 77b is operated in the contracting direction to return the arm 76 to an original position in which it faces the lifter 72a.

In operation, the core pinching means 52 in the assembling unit 9 is moved to a predetermined position above the core feeding station 53; the uppermost core $W_2$ is lifted by lifting the cores $W_2$ in the magazines 68 by the lifter 72a and is picked up by the pinching means 52; the core pinching means 52 is moved to the assembling station 8; and then it is lowered. According to the above operations, a condition is attained in which a core $W_2$ is mounted on the blades $W_1$ on the workpiece setting jig 2 on the jig cart 16 which has been moved to the assembling station 8. By subsequently rotating the workpiece setting jig 2, the projections a on respective blades $W_1$ are fitted into holes b in the core $W_2$ when the projections a of respective blades $W_1$ and the holes b of the core $W_2$ have come into engagement with each other, thus completing the assembling of the core $W_2$ with the blades $W_1$.

In this assembling work, if there is a slight misalignment between the core $W_2$ which is pinched by the pinching means 52 and the blades $W_1$ which are set on the workpiece setting jig 2, or if some of the blades $W_1$ on the workpiece setting jig 2 are off the position relative to the inserting grooves 2a of the jig 2, there is a possibility of giving rise to a poor assembling.

Therefore, in this embodiment, the supporting plate 52a of the core pinching means 52 is mounted to the lifting frame 51 of the assembling unit 9 via a flexible joint member 78 so that the core pinching means 52 can be movable in the horizontal and vertical directions and also can be inclined.

Figure 23:
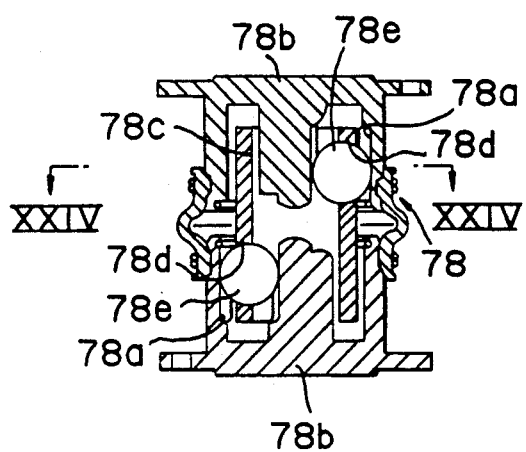
FIG. 23 is a sectional front view of a joint member.
Figure 24:
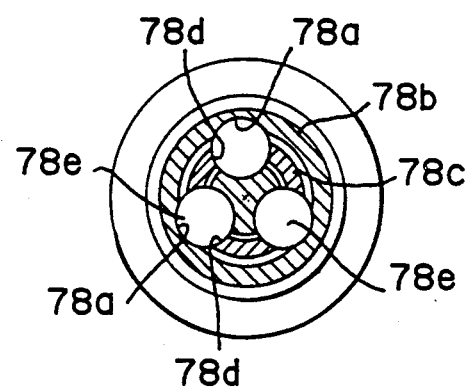
FIG. 24 is a sectional plan view taken along the line XXIV—XXIV of FIG. 23.
Figure 28:
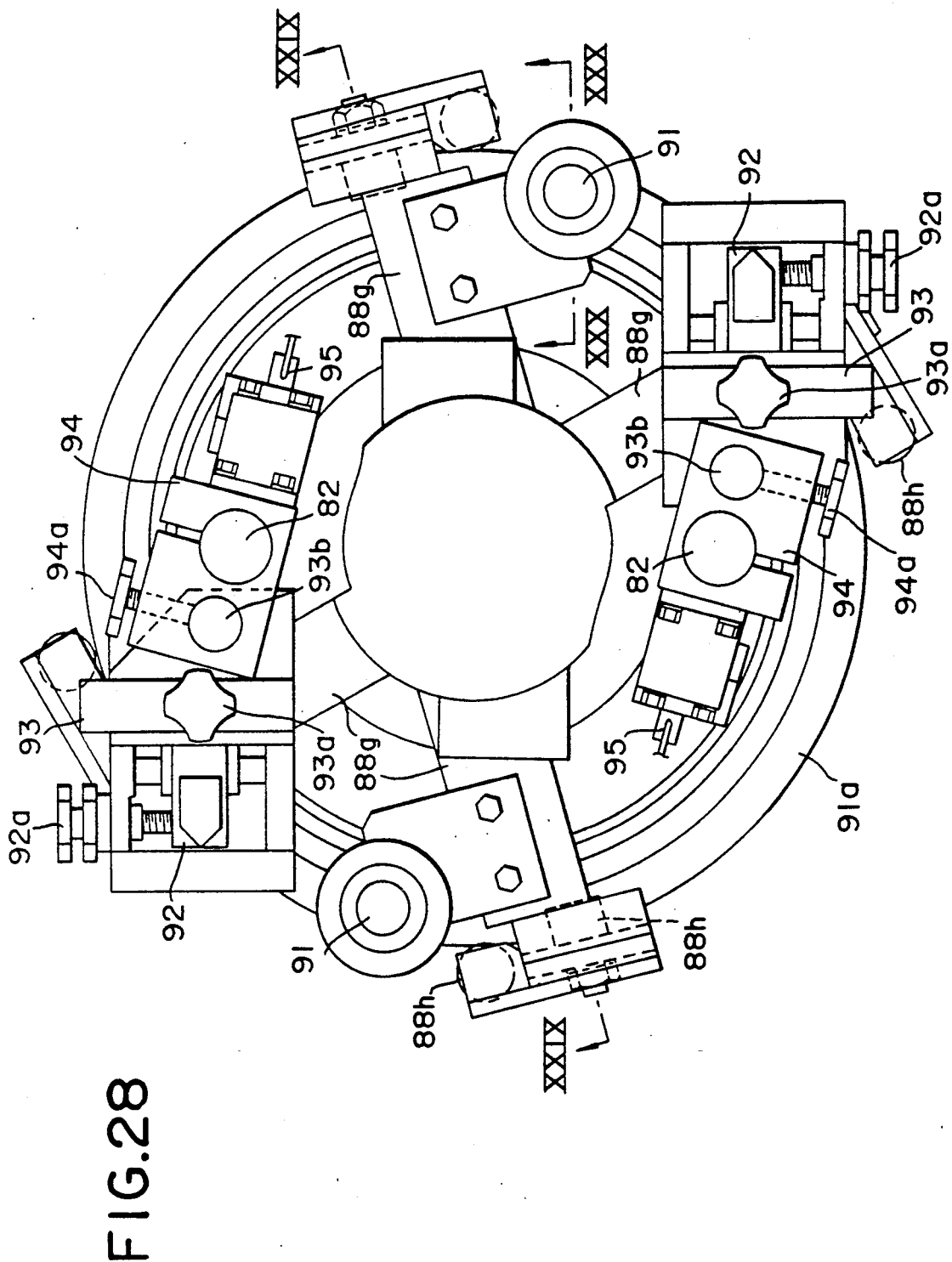
FIG. 28 is a plan view thereof.

The joint member 78 comprises, as shown in FIGS. 23 and 24, a pair of upper and lower outer members 78b, 78b which have three vertically elongated ball grooves 78a, and a cylindrical inner member 78c. Ball windows 78d are provided at upper and lower portions of the inner member 78c in a staggered phase. Both outer members 78b, 78b are connected to the inner member 78c via six balls 78e mounted in the ball windows 78d of the inner member 78c and engaged in the ball grooves 78a in the outer members 78b, 78b.

In this arrangement, when a misalignment has occurred between the core $W_2$ on the core pinching means 52 and the blades $W_1$ which are set on the workpiece setting jig 2 as shown in FIG. 25(A), the lower surface of the core $W_2$ touches the upper edge of the indented portion c of the blades $W_1$ in which the core $W_2$ is to be mounted, when the core $W_2$ is lowered as shown in FIG. 25(B). Then, by the operation of the joint member 78, the core $W_2$ is inclined via the supporting plate 52a and the core $W_1$ is moved to the direction of inclination as shown in FIG. 25(C) and, consequently, the centers of the blades $W_1$, and of the core $W_2$ coincide with each other as shown in FIG. 25(D). Thereafter, by rotating the workpiece setting jig 2 by a predetermined angle, the projections a of the blades $W_1$ get fitted with the holes b of the core $W_2$ as shown in FIG. 25(E), thereby completing the assembling of the core $W_2$. In the case where, as shown in FIG. 26(A), a plurality of blades $W_1$ are misaligned against respective inserting grooves 2a of the blade setting jig 2, when upper edges of the indented portion c of the blades $W_1$ into which the core $W_2$ is to be fitted come into contact with the lower surface of the core $W_2$ through the lowering thereof as shown in FIG. 26(B), the core $W_2$ is inclined via the supporting plate 52a by the operation of the joint member 78 in the same manner as in the above-mentioned case. The blades $W_1$ concerned are thus pushed radially outward to attain a condition, as shown in FIG. 26(D), in which the blades $W_1$ concerned are fitted into the inserting grooves 2a and in which the lower surface of the core $W_2$ abuts the projections a of the blades $W_1$. By subsequently rotating the workpiece setting jig 2 by a predetermined angle, the projections a of the blades $W_1$ are fitted into the holes b of the core $W_2$, as shown in FIG. 26(E), thus completing the assembling of the core $W_2$.

Figure 18:
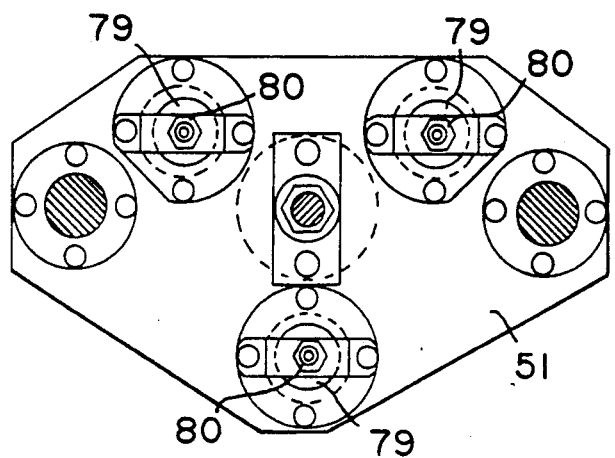
FIGS. 18 and 19 are sectional plan views taken along the lines XVIII—XVIII and XIX—XIX, respectively, of FIG. 17.

As shown in FIGS. 17 and 18, three posts 79 are vertically provided on the upper surface of the supporting plate 52a and are inserted into holes 51c in the lifting frame 51 with a clearance on the external periphery thereof. Three proximity switches 80 are provided on the lifting frame 51 in a position to face each of the posts 79. The lifting frame 51 is lowered to a predetermined assembling position, and then the lower surface of the core $W_2$ pinched by the core pinching means 52 abuts the projections a of the blades $W_1$ which are on the workpiece setting jig 2. The proximity switches 80 detect that the supporting plate 52a has been lowered relative to the lifting frame 51 from a slightly lifted position relative to the lifting frame 51, thus enabling confirmation that the projections a of the blades $W_1$ have been inserted into the holes b of the core $W_2$, In assembling the core $W_2$, in order to prevent an excessive force from being exerted on the blades $W_1$ by a successive rotation of the workpiece setting jig 2 after the projections a have been inserted into each of the holes of the core $W_2$, the core $W_2$ shall be pinched relatively gently by the core pinching means 52.

The welding unit 11 comprises, as shown in FIGS. 2 and 27, a pair of welding torches 82, 82, an inner blade pressing member 83 to press the blades $W_1$ from above, an outer blade pressing member 84, and a core pressing member 85 to press the core $W_2$ from above, all mounted on a lifting frame 81. Each of the guide rods 81a which is vertically provided on the lifting frame 81 is inserted into slide bearings 86a at an upper part of a supporting column 86 provided in the welding station 10. A piston rod of a cylinder 87 which is vertically provided above the supporting column 86 is connected to the lifting frame 81 so that up and down movements can be given to the lifting frame 81 by the operation of the cylinder 87.

As shown in FIGS. 27 through 30, a pressing cylinder 88 is fixed under the lifting frame 81 which has large and small first and second cylinder bores 88a, 88b. The inner blade pressing member 83 is attached via a bearing 89 to a lower end of a piston rod 88d of a first piston 88c fitted into the first cylinder bore 88a. The core pressing member 85 is attached to a lower end of a cylindrical shaft 88f which is rotatably mounted via a bearing 90 on a second piston 88e fitted into the second cylinder bore 88b. A pair of rollers 88h, 88h rotatably supporting the outer blade pressing member 84 are respectively provided at the outer end of four stays 88g which extend radially outward of the cylinder 88. A sliding ring 91a is provided on the upper surface of the outer blade pressing member 84. A grounding electrode 91 which slidably contacts the sliding ring 91a is respectively provided on two radially opposite stays 88g.

A first sliding block 92 which is radially movable by a first adjusting bolt 92a is respectively provided on each of the remaining two stays 88g, 88g out of the four stays 88g. A second sliding block 93 which is movable in the vertical direction by a second adjusting bolt 93a is respectively provided on each of the first sliding blocks 92. A torch holder 94 for holding each of the welding torches 82 is rotatably supported by a supporting shaft 93b which is vertically provided on the second sliding block 93. A feeding apparatus 95 for feeding welding wire is mounted on each of the torch holders 94. In this manner, the welding positions of the welding torches 82 and the feeding apparatuses 95 relative to the core $W_2$ are adjustable by means of the first, second and third adjusting bolts 92a, 93a, 94a depending on the kind and model of the workpieces.

Figure 12:
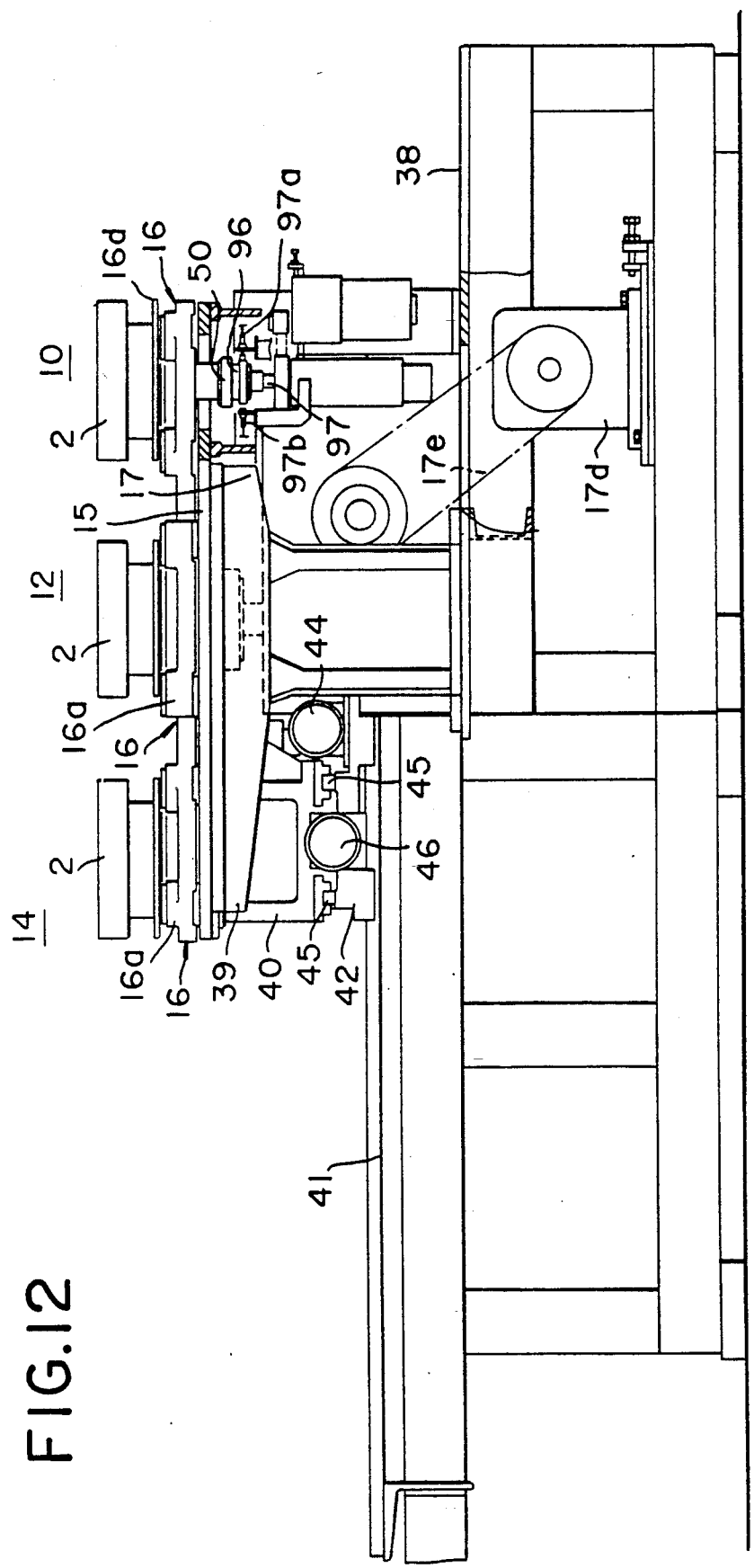
FIG. 12 is a side view as seen from the line XII—XII thereof.

As shown in FIGS. 11 and 12, a rotatable shaft 97 is vertically provided underneath the guide rails 15 at the welding station 10 and has an engaging piece 96 to be engaged with the clutching piece 50 of the rotatable table 16d of the jig cart 16. A zero point detecting proximity switch 97a for detecting a zero phase in which the engaging piece 96 engages with the clutching piece 50, and a proximity switch 97b for detecting the rotation of the rotatable shaft 97 through 190 degrees from the zero point are provided in an upper portion of the frame body rotatably supporting the rotatable shaft 97. Thus, the workpiece setting jig 2 on the jig cart 16 in the welding station 10 can be rotated by a predetermined degree by the rotatable shaft 97.

Explanation is omitted of the rotating mechanism to rotate the rotatable shaft 97 and of the lifting mechanism of the rotatable shaft 97 to engage the engaging piece 96 with the clutching piece 50, because they are identical with those of the rotatable shaft 61 provided in the assembling station 8 described hereinabove.

In this arrangement, the lifting frame 81 is lowered to a predetermined welding position by the operation of the cylinder 87, thereby pushing the outer portion of the blades $W_1$ with the outer blade pressing member 84. The pressing cylinder 88 is operated in the direction of extension so that the inner portion of the blades $W_1$ is pressed via the first piston 88c and the inner blade pressing member 83 and so that the core $W_2$ is pressed via the second piston 88e and the core pressing member 85. By lifting the rotatable shaft 97, the engaging piece 96 engages with the clutching piece 50 of the rotatable table 16d of the jig cart 16. While the workpiece setting jig 2 is being rotated, the projections a of the blades $W_1$ and the core $W_2$ are welded together by TIG welding by the welding torches 82, 82.

Figure 14:
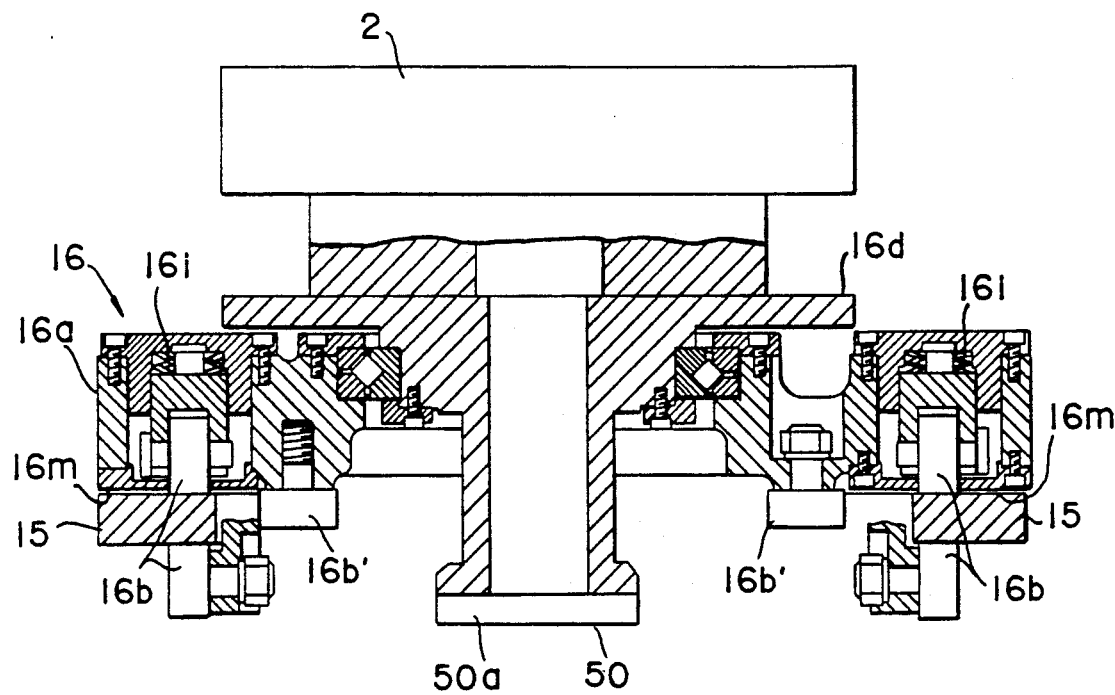
FIGS. 13 through 16 are enlarged sectional views taken along the lines XIII—XIII, XIV—XIV, XV—XV and XVI—XVI, respectively, of FIG. 11.

In this case, if the blades $W_1$ and the core $W_2$ are pressed by the blade pressing members 83, 84 and the core pressing member 85, the rollers 16b at the upper portion of the jig cart 16 will be subjected to an excessive force. Therefore, these rollers 16b are mounted via coned disc springs 16i as shown in FIG. 14 so that, when the blades $W_1$ and the core $W_2$ are pressed by the blade pressing members 83, 84 and the core pressing member 85, the rollers 16b are moved upwards against the coned disc springs 16i and a seat 16m at the lower surface of the frame 16a closely contacts the guide rail 15.

Figure 32:
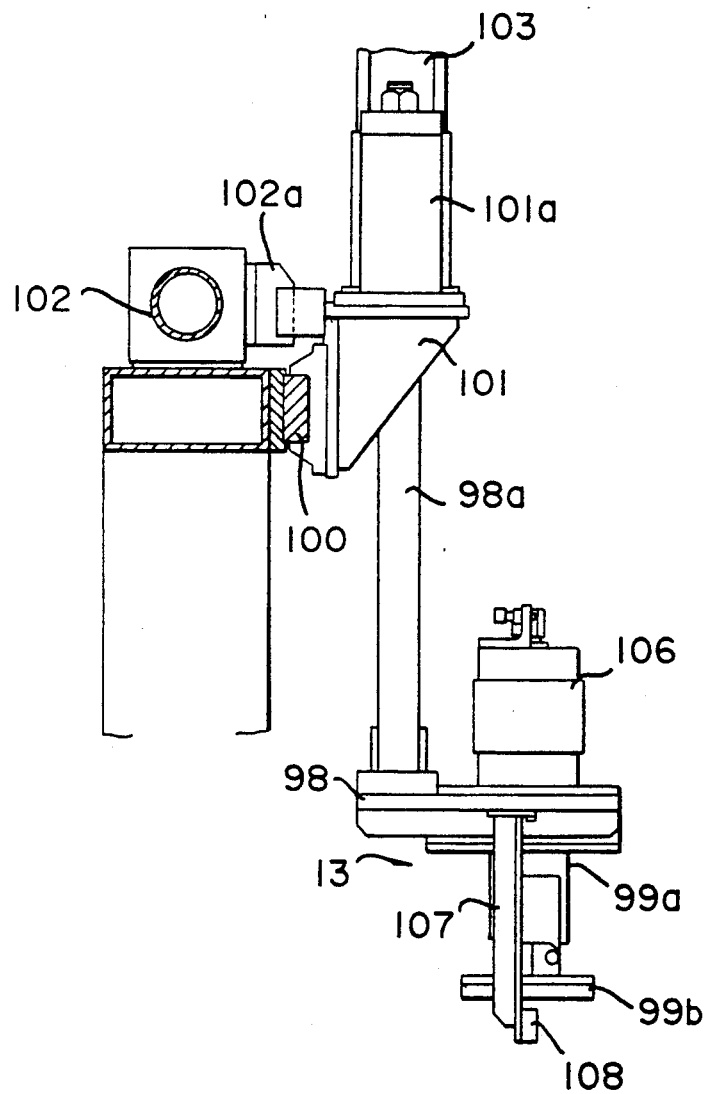
FIG. 32 is a side view as seen from the line XXXII—XXXII of FIG. 31.

The discharging unit 13 comprises, as shown in FIGS. 31 and 32, a pinching means 99 provided on a lifting frame 98 which detachably pinches the welded blade subassembly. A rail 100 extends from an upper position of the discharging station 12 to an upper position of a conveyor $4_1$ in front thereof. A sliding member 101 is supported by the rail 100. A movable part 102a of a rodless cylinder 102 is engaged with the sliding member 101. A pair of guide rods 98a, 98a are vertically provided on the lifting frame 98, each inserted into slide bearings 101a provided on the sliding member 101. A piston rod 103a of a cylinder 103 which is vertically provided on the sliding piece 101 is connected to the lifting frame 98. In this manner, the lifting frame 98 is subjected to up and down movements by the operation of the cylinder 103 as well as to forward and backward movements by the rodless cylinder 102 via the sliding member 101.

The pinching means 99 is provided with a pair of pinching arms 99b, 99b which are opened and closed in the horizontal direction by a cylinder 99a. The pinching means 99 is attached at the cylinder 99a to the bottom surface of the shaft portion 105 which is rotatably supported by the lifting frame 98 via a bearing 104. An output shaft of an electric motor 106 which is mounted on an upper side of the lifting frame 98 is connected to the shaft portion 105. A pair of brackets 107 are provided at a lower side of the lifting frame 98, and a counter 108 is provided on each of the brackets 107. In this manner, by rotating the blade sub-assembly W pinched by the pinching means 99 through one half of a revolution by the electric motor 106, the number of blades $W_1$ of the blade sub-assembly can be counted by the counters 108, 108.

The rotatable table 16d of each jig cart 16 is designed such that the engaging groove 50a of the clutching piece 50 is maintained in the zero phase in which the groove 50a looks towards the longitudinal direction of the rails 41. There is, however, a fear that, when the rotatable table 16d is reciprocated between the setting station 6 and the charging station 14 or is moved along the guide rails 15, the phase of the rotatable table 16d will become misaligned.

Therefore, as shown in FIG. 16, a taper headed pin 16k which is engageable with a hole 16j in the rotatable table 16d is provided in the frame 16a of each jig cart 16. A cylinder 109 which presses the tapered pin 16k against the biasing of a spring 16e is provided in each of the charging station 14, the assembling station 8 and the welding station 10. When the jig cart 16 is sent by the transferring apparatus 17 to the charging station 14, the assembling station 8 and the welding station 10, each of the cylinders 109 is operated in the extending direction to fit the tapered head of the pin 16k to the hole 16j of the rotatable table 16d, thus aligning the zero phase of the rotatable table 16d of the jig cart 16 in that station. In this manner, the engagement between each of the engaging pieces 47a, 60, 96, and the clutching piece 50 of the rotatable table 16d can securely be made at the assembling station 8, the welding station 10 and the setting station 6.

Next, the method of assembling the blades according to this invention is explained.

First, the workpiece setting jig 2 is moved to the workpiece setting station 6 by the movement of the movable rails 15a. The blades $W_1$ press-formed by the progressive press machine $1_1$ are set in position one by one onto the workpiece setting jig 2. Then, the workpiece setting jig 2 is moved to the charging station 14 by the movement of the movable rails 15, and is moved by the transferring apparatus 17 to the assembling station 8 along the guide rails 15 where the core $W_2$ is assembled with the blades $W_1$ on the workpiece setting jig 2. Then, the workpiece setting jig 2 is moved by the transferring apparatus 17 to the welding station 10 along the guide rails 15 where the blades $W_1$ and the core $W_2$ are welded together by the welding unit 11. Thereafter, the workpiece setting jig 2 is moved by the transferring apparatus 17 to the discharging station 12 where the welded blade sub-assemblies W are taken out of the workpiece setting jig 2 and transferred to the conveyor $4_1$. The emptied workpiece setting jig 2 is moved by the transferring apparatus 17 to the charging station 14 along the guide rails 15 and is moved back to the setting station 6 by the movement of the movable rails 15a to again enable setting of the blades $W_1$ on the workpiece setting jig 2 by the workpiece setting apparatus 7.

Then, the workpiece setting jig 2 is moved to the charging station 14 by the movement of the movable rails 15a, and the above-mentioned operations are repeated to continuously perform the assembling of the blades.

By arranging the charging station 14, the assembling station 8, the welding station 10 and the discharging station 12 in a circular form to the side of the setting station 6, the lateral dimensions of the layout space can be largely reduced as compared with the conventional system in which the assembling station, welding station and the discharging station are linearly arranged to the side of the setting station.

Therefore, when two sets of progressive press machines $1_1$, $1_2$ are arranged in parallel, each of the assembling apparatuses $3_1$, $3_2$ is provided on the laterally inner side of the parallel arrangement of each of the press machines $1_1$, $1_2$. Circularly disposed groups of stations comprising the charging station 14, the assembling station 8, the welding station 10 and the discharging station 12 for each of the assembling apparatuses are arranged in parallel, relative to each of the setting stations, on a laterally inner side of parallel arrangement of the assembling apparatuses $3_1$, $3_2$. When each of the charging stations 14, 14 is disposed to face each of the setting stations 6, 6, and each of the discharging stations 12 is disposed to look towards a front direction (the right side in FIG. 1), it becomes possible to discharge the turbine wheel sub-assemblies of the blades $W_1$, and the cores $W_2$ and the pump wheel sub-assemblies of the blades $W_1$, and the cores $W_2$ by the discharging units 13, 13 from the discharging stations 12, 12 of both assembling apparatuses $3_1$, $3_2$ to the working place 5 which is disposed towards an intermediate front portion between both assembling apparatuses $3_1$, $3_2$. Hence, it becomes possible at the working place 5 to assemble shells with each of the sub-assemblies so that the turbine wheel sub-assemblies and the pump wheel sub-assemblies are transported as a set from the working place 5 towards the next step. It is therefore possible to lay out the entire system for assembling effectively from a viewpoint of space utilization. In addition, the distance between both assembling stations 8, 8 can be shortened and, consequently, the distance of movement of the worker is shortened. Therefore, it becomes possible to perform the feeding work of the cores $W_2$ to each of the assembling units 9 by a single worker.

By the way, it is also possible to set the blades $W_1$ directly on a shell by means of the workpiece setting apparatus 7, without using the workpiece setting jig 2.

In this case, the above-described assembling apparatuses $3_1$, $3_2$ are modified such that a station for feeding and setting a shell on the jig cart 16 is provided between the charging station 14 and the discharging station 12 and that the jig cart 16 on which the shell has been set in position is returned from the charging station 14 to the setting station 6.

It is readily apparent that the above-described has the advantage of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

What is claimed is:

1. A method of assembling workpieces comprising the steps of:
   providing a setting station;
   disposing a charging station in a position facing and setting station, and disposing said charging station, an assembling station, a welding station, and a discharging station in a circular form to a side of said setting station;
   setting a first workpiece on a workpiece setting jig at said setting station;
   transferring said workpiece setting jig in a linear direction from said setting station to said charging station;
   intermittently transferring said workpiece setting jig in a circular direction in sequence from said charging station to said assembling station, said welding station and said discharging station;
   assembling a second workpiece with the first workpiece which has been set on said workpiece setting jig while said workpiece setting jig is at said assembling station;
   welding the first and the second workpieces together while said workpiece setting jig is at said welding station;
   discharging the welded workpieces by taking them off said workpiece setting jig when said workpiece setting jig is at said discharging station; and
   returning said workpiece setting jig which has been emptied after said discharging from said charging station to said setting station.

2. An apparatus for assembling workpieces in which an assembling work is performed which comprises:
   a workpiece setting jig;
   a setting station including a workpiece setting apparatus for setting a first workpiece on said workpiece setting jig;
   an assembling station including an assembling unit for assembling a second workpiece with the first workpiece on said workpiece setting jig;
   a welding station including a welding unit for welding the first and the second workpieces together;
   a discharging station including a discharging unit for taking the welded workpieces out of said workpiece setting jig;
   a charging station provided in a position which faces said setting station as seen in the direction of sending and withdrawing said workpiece setting jig;
   said charging station, said assembling station, said welding station and said discharging station being arranged in a circular form;
   means for circulating said workpiece setting jig in a circular direction among said charging station, said assembling station, said welding station and said discharging station in sequence; and
   means for reciprocating said workpiece setting jig in a linear direction between said setting station and said charging station.

3. An apparatus for assembling workpieces according to claim 2,
   wherein said means for circulating includes circular guide rails passing through said charging station, said assembling station, said welding station and said discharging station, a jig cart on which said workpiece setting jig can be supported being supported by said circular guide rails, and a transferring means for intermittently transferring said jig cart along said guide rails from said charging station to said assembling station, said welding station and said discharging station in this order; and
   said means for reciprocating includes that part of said guide rails which corresponds to said charging station constructed as movable rails which can be reciprocated between said charging station and said setting station.

4. An apparatus for assembling workpieces according to claim 3, wherein said means for reciprocating further includes travelling rails laid between said charging station and said setting station, and a movable base which is mounted on said travelling rails, said movable rails being provided on said movable base such that said movable rails are movable in a direction crossing at right angles with the longitudinal direction of said travelling rails.

5. An apparatus for assembling workpieces according to claim 2, wherein the first workpiece is a press-formed workpiece, and wherein said workpiece setting apparatus comprises:
   a discharging apparatus having a workpiece receiving member which is provided underneath a lower mold of a press machine for press-forming the workpiece so as to face an ejection hole of the lower mold, said workpiece receiving member being movable downwards in an interlocking relationship with an upward movement of an upper mold of the press machine and upwards in an interlocking relationship with a downward movement of the upper mold, and a workpiece supporting means which is movable to a position right below the lower mold from a takeout position in front thereof in an interlocking relationship with a downward movement of the upper mold and to the takeout position from the position right below the lower mold in an interlocking relationship with an upward movement of the upper mold; and a transferring apparatus having a workpiece pinching means which is movable from the takeout position to an upper position of said workpiece setting jig in front thereof in an interlocking relationship with a downward movement of the upper mold and from the upper position of said workpiece setting jig to the takeout position in an interlocking relationship with an upward movement of the upper mold.

6. An apparatus for assembling workpieces according to claim 5, further comprising a base plate provided on a bolster of the press machine and movable sideways relative to the bolster; and wherein said workpiece receiving member, said discharging apparatus and said transferring apparatus are mounted on said base plate.

7. An apparatus for assembling workpieces according to claim 5, wherein said discharging apparatus comprises a pair of right and left transfer bars which have a receiving portion formed on upper surfaces thereof for supporting both sides of the workpiece from underneath and which are movable back and forth, and means for moving said pair of transfer bars; and wherein said workpiece receiving member is disposed between said pair of said transfer bars.

8. An apparatus for assembling workpieces according to claim 5, wherein the press-formed workpiece are blades of a turbine wheel or a pump wheel of a torque converter and wherein said workpiece setting jig is provided with a number of radially formed inserting grooves which can hold the blades in the same posture as that in which the blades are to be mounted on a shell of the turbine wheel or the pump wheel, and wherein means are provided at said setting station for index-rotating said workpiece setting jig by a pitch in which the inserting grooves are arranged.

9. An apparatus for assembling workpieces according to claim 5, wherein said transferring apparatus comprises:

a movable frame on which said workpiece pinching means for detachably pinching the press-formed workpiece is provided at its rear end;

a crank arm for rotatably supporting said movable frame;

a sliding member disposed in front of said crank arm;

a first link connecting said crank arm to said sliding member for performing a substantially linear movement of said sliding member according to the rotation of said crank arm;

a fixed arm which is fixed to said sliding member in a positional relationship such that, when said first link rotates relative to said sliding member while moving forwards by the rotation of said crank arm, the angle between said fixed arm and said first link becomes smaller; and a second link connecting a front end of said movable frame and said fixed arm, said second link being arranged so that an extended axial line thereof passes above a supporting shaft for supporting said movable frame on said crank arm.

10. An apparatus for assembling workpieces according to claim 2, wherein the first workpiece are blades for a turbine wheel or a pump wheel of a torque converter and the second workpiece is a core to be assembled with the blades, and wherein said assembling unit comprises:

a lifting frame disposed in said assembling station;

a supporting plate;

a joint member mounting said supporting plate on said lifting frame so as to be movable in the horizontal and upward directions and be able to incline;

a core pinching means mounted on said supporting plate for relatively gently pinching the core at an external periphery thereof;

a sensor for detecting the upward and downward movements of said supporting plate relative to said lifting frame; and a rotating mechanism for rotating said workpiece setting jig which is positioned in said assembling station.

11. A system for assembling workpieces which include a turbine wheel and a pump wheel for a fluid torque converter, comprising:

an assembling apparatus for assembling blades with a core for a turbine wheel sub-assembly;

an assembling apparatus for assembling blades with a core for a pump wheel sub-assembly, both of said assembling apparatuses being provided in parallel with each other at a distance therebetween in the lateral direction; and a working place provided towards an intermediate front portion between both of said assembling apparatuses, said working place being for assembling a shell respectively with the turbine wheel sub-assembly and the pump wheel sub-assembly, the sub-assemblies being discharged from each of said assembling apparatuses;

each of said assembling apparatuses comprising:

a workpiece setting jig, a setting station having disposed therein a workpiece setting apparatus in which a plurality of blades as a first workpiece are set on said workpiece setting jig in the same posture as that in which the blades are to be assembled with the shell, a charging station, means for reciprocating said workpiece setting jig between said setting station and said charging station, an assembling station having disposed therein an assembling unit in which the core as a second workpiece is assembled with the blades which have been set in place on said workpiece setting jig, a welding station having disposed therein a welding unit in which the blades and the core are welded together to produce the sub-assembly, a discharging station having disposed therein a discharging unit in which the sub assembly of the blades and the core is taken out of said workpiece setting jig, and means for circulating said workpiece setting jig between said charging station, said assembling station, said welding station and said discharging station in sequence;

said charging station, said assembling station, said welding station and said discharging station of each of said assembling apparatuses being disposed in a circular form such that they are positioned, relative to the respective setting station, on an inner side of the parallel arrangement of said assembling apparatuses;

each said charging station being disposed to face the respective setting station; and each said discharging station being disposed to look towards a front direction.

12. A system for assembling workpieces according to claim 11, wherein said means for circulating includes circular guide rails passing through said charging station, said assembling station, said welding station and said discharging station, a jig cart on which said workpiece setting jig can be supported being supported by said circular guide rails, and a transferring means for intermittently transferring said jig cart along said guide rails from said charging station to said assembling station, said welding station and said discharging station in this order; and said means for reciprocating includes that part of said guide rails which corresponds to said charging station constructed as movable rails which can be reciprocated between said charging station and said setting station.

13. A system for assembling workpieces according to claim 12, wherein said means for reciprocating further includes travelling rails laid between said charging station and said setting station, and a movable base which is mounted on said travelling rails, said movable rails being provided on said movable base such that said movable rails are movable in a direction crossing at right angles with the longitudinal direction of said travelling rails.

* * * * *

UNITED STATES PATENT AND TRADEMARK OFFICE
CERTIFICATE OF CORRECTION

PATENT NO. : 5,104,033
DATED : April 14, 1992
INVENTOR(S) : Haruo TANAKA et al

It is certified that error appears in the above-identified patent and that said Letters Patent is hereby corrected as shown below:

On the cover page, Item [30], delete "Jul. 9, 1989" and insert therefor -- Sep. 7, 1989 --; and delete "Mar. 8, 1990" and insert therefor -- Aug. 3, 1990 --.

Signed and Sealed this

Tenth Day of August, 1993

Attest:

MICHAEL K. KIRK

Attesting Officer        Acting Commissioner of Patents and Trademarks

UNITED STATES PATENT AND TRADEMARK OFFICE
CERTIFICATE OF CORRECTION

PATENT NO. : 5,104,033
DATED : April 14, 1992
INVENTOR(S) : Haruo TANAKA et al

It is certified that error appears in the above-identified patent and that said Letters Patent is hereby corrected as shown below:

Column 19, line 48, change "and" to -- said --.

Signed and Sealed this

Thirtieth Day of November, 1993

Attest:

BRUCE LEHMAN

Attesting Officer　　Commissioner of Patents and Trademarks